United States Patent
Storiale et al.

(10) Patent No.: US 12,327,234 B2
(45) Date of Patent: Jun. 10, 2025

(54) REVERSE TERMINAL PAYMENT SYSTEMS AND METHODS

(71) Applicant: Synchrony Bank, Stamford, CT (US)

(72) Inventors: Michael Storiale, Stamford, CT (US); Sih Lee, Stamford, CT (US); William Kievit, Stamford, CT (US); Jennifer Cantor, Chicago, IL (US); Jake Miller, Stamford, CT (US); Noah Pell, Champaign, IL (US); Christopher Bauer, Stamford, IL (US); Lisa Hammond, Alpharetta, GA (US)

(73) Assignee: Synchrony Bank, Stamford, CT (US)

( * ) Notice: Subject to any disclaimer, the term of this patent is extended or adjusted under 35 U.S.C. 154(b) by 176 days.

(21) Appl. No.: 18/060,756

(22) Filed: Dec. 1, 2022

(65) Prior Publication Data

US 2023/0186276 A1  Jun. 15, 2023

Related U.S. Application Data

(60) Provisional application No. 63/289,262, filed on Dec. 14, 2021.

(51) Int. Cl.
*G06Q 20/32* (2012.01)
*G06Q 20/20* (2012.01)
*G06Q 20/40* (2012.01)

(52) U.S. Cl.
CPC ......... *G06Q 20/3272* (2013.01); *G06Q 20/20* (2013.01); *G06Q 20/322* (2013.01); *G06Q 20/409* (2013.01)

(58) Field of Classification Search
CPC .. G06Q 20/3272; G06Q 20/20; G06Q 20/322; G06Q 20/409

USPC .......................................................... 705/16
See application file for complete search history.

(56) References Cited

U.S. PATENT DOCUMENTS

| 2018/0241577 | A1* | 8/2018 | D'Souza | H04L 63/0492 |
| 2020/0097952 | A1* | 3/2020 | Piparsaniya | G06F 3/167 |

OTHER PUBLICATIONS

Shreshta, Babins et al. Context-Enhanced Mobile Device Authorization and Authentication. University of Alabama at Birmingham. ProQuest Dissertations. 2016. (Year: 2016).*

* cited by examiner

*Primary Examiner* — Florian M Zeender
*Assistant Examiner* — Fawaad Haider
(74) *Attorney, Agent, or Firm* — Polsinelli LLP

(57) ABSTRACT

An application executed on a user device receives a request to initiate a transaction with an entity associated with a device implemented at a point-of-sale. The application detects that the user device is proximate to the device and detects an audial tone that encodes information corresponding to an entity associated with the device. The application transmits a request to transfer a payment to the entity, wherein the request includes the information and a payment amount for the payment. When the request is received by a payment processing system, the payment processing system transfers the payment to the entity and provides a confirmation for the payment. The application broadcasts a confirmation audial tone that encodes the confirmation. When the confirmation audial tone is received at the device, the device demodulates the confirmation audial tone to provide the confirmation to the entity.

21 Claims, 10 Drawing Sheets

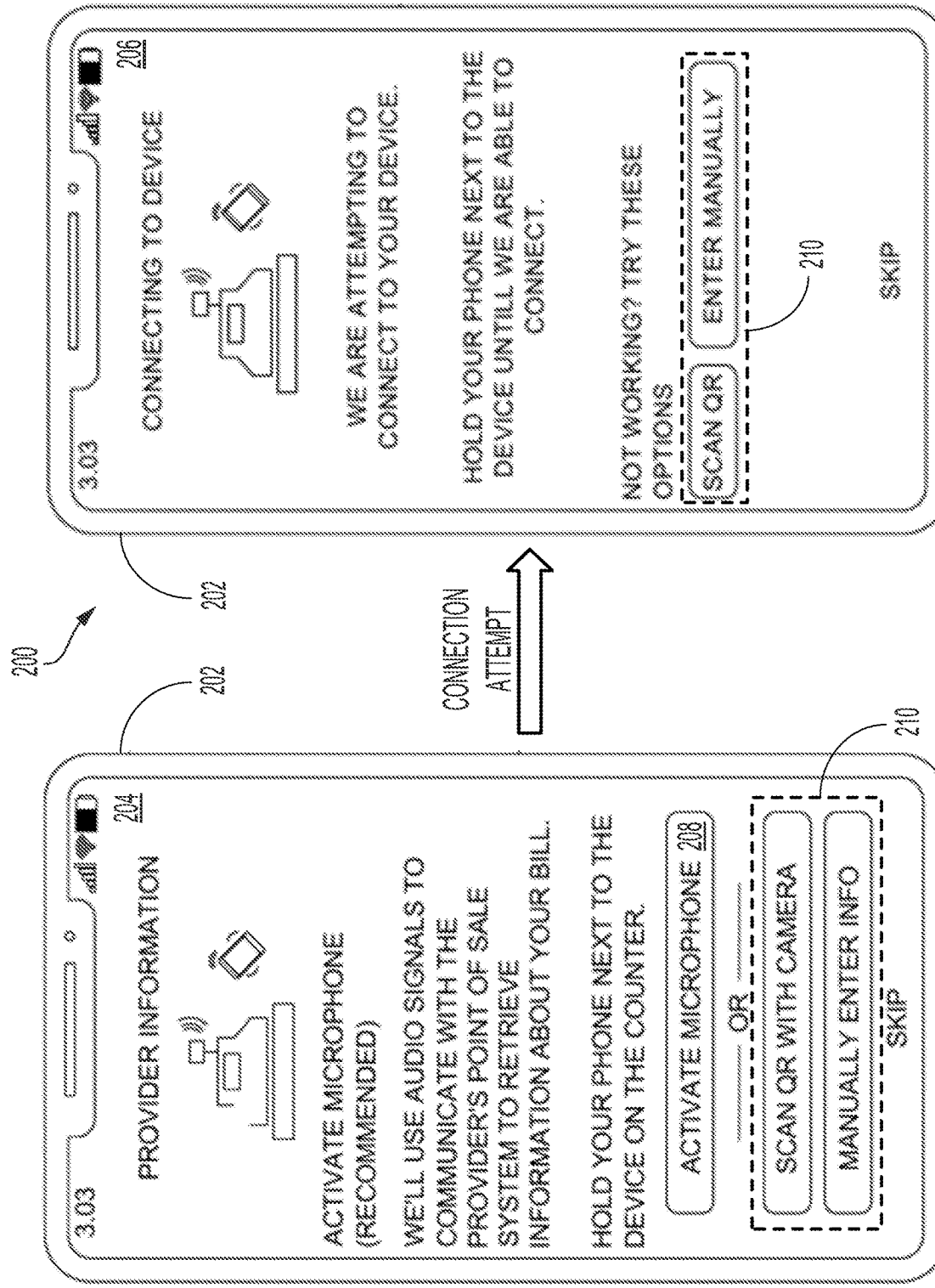

FIG. 3C

REVERSE TERMINAL PAYMENT SYSTEMS AND METHODS

CROSS-REFERENCE TO RELATED APPLICATIONS

The present patent application claims the priority benefit of U.S. Provisional Patent Application 63/289,262 filed Dec. 14, 2021, the disclosures of which are incorporated herein by reference in its entirety.

FIELD

The present disclosure relates generally to payment systems and methods. In one example, a payment made to another entity is processed through a reverse payment system (e.g., through a user's device rather than through a point-of-sale device) and is combined with secure instant verification of payment for the other entity, independent from the user's device. The verification for payment-including both authorization for and confirmation that the payment was processed—is derived from a hardware/software device that utilizes data-over-audio technology.

BACKGROUND

Certain entities often utilize payment solutions that have dedicated payment terminals to accept payments made with credit and debit cards. These dedicated terminals cause infrastructure limitations and create additional cost, since these entities require a dedicated terminal that can securely connect, over a communications network (e.g., Internet), with a financial institution. Further, these dedicated terminals can be difficult or onerous to configure and to make operational. For instance, setting up a dedicated terminal can usually require someone with a skilled technical background to implement the dedicated terminal. Accordingly, there is a need to migrate towards digital payments that require minimal effort and minimal cost for clients to integrate with their existing point-of-sale infrastructure, such as payment solutions that are simple to implement for entities who do not have an Internet connection and/or do not have the means to employ or train someone skilled to do so. Additionally, there needs to be a secure and quick way to confirm successful user payments made to these entities.

SUMMARY

Disclosed embodiments may provide a system for processing payment to another entity through a user device rather than through a device implemented at a point-of-sale.

According to some embodiments, a computer-implemented method is provided. The computer-implemented method comprises receiving a request to initiate a transaction with an entity associated with a device implemented at a point-of-sale. The device implemented at the point-of-sale is implemented without network connectivity. The computer-implemented method further comprises detecting that a user device is proximate to the device. Further, the computer-implemented method comprises receiving an audial tone from the device. This audial tone encodes information corresponding to the entity associated with the device. The computer-implemented method further comprises transmitting a request to transfer a payment to the entity associated with the device. The request includes the information and a payment amount for the payment. Additionally, when the request is received by a payment processing system, the payment processing system transfers the payment to the entity. The computer-implemented method further comprises receiving a confirmation that indicates that the transaction has been completed. The computer-implemented method further comprises broadcasting a confirmation audial tone. The confirmation audial tone encodes the confirmation. Additionally, when the confirmation audial tone is received at the device, the device demodulates the confirmation audial tone to provide the confirmation to the entity.

In some embodiments, the confirmation further indicates a set of characteristics for the confirmation audial tone. Further, the set of characteristics correspond to an algorithmic library implemented by the point-of-sale device for authentication of the confirmation audial tone.

In some embodiments, the computer-implemented method further comprises transmitting another audial tone that includes cryptographic information that enables a handshake process between the user device and the point-of-sale device.

In some embodiments, the confirmation audial tone is generated using ultrasonic sound produced using one or more speakers of the user device.

In some embodiments, the computer-implemented method further comprises triggering a notification to initiate the transaction. The notification is triggered in response to detecting the proximity. The computer-implemented method further comprises receiving an input. The input corresponds to the transaction and to the entity. Further, the computer-implemented method comprises establishing a connection to a payment processor system to complete the transaction. The connection is established based on the input.

In some embodiments, the computer-implemented method further comprises automatically activating a microphone implemented on the user device. The microphone is automatically activated in response to detecting that the proximity.

In some embodiments, the computer-implemented method further comprises evaluating the information corresponding to the entity. The computer-implemented method further comprises determining that additional information is required for the transaction. The computer-implemented method further comprises updating the user device to provide a prompt for the additional information.

In an embodiment, a system comprises one or more processors and memory including instructions that, as a result of being executed by the one or more processors, cause the system to perform the processes described herein. In another example, a non-transitory computer-readable storage medium stores thereon executable instructions that, as a result of being executed by one or more processors of a computer system, cause the computer system to perform the processes described herein.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIGS. 2A-2B show an illustrative example of an environment in which an application executed on a user device engages a microphone on the user device to detect a tone from a point-of-sale device to establish a connection between the user device and the point-of-sale device in accordance with at least one embodiment;

FIGS. 3A-3C show an illustrative example of an environment in which an application executed on a user device obtains identifying information associated with another entity from a point-of-sale device that is used to initiate a payment transaction for submission of a payment to the other entity in accordance with at least one embodiment;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Disclosed embodiments provide a framework through which an application installed on a user device enables servicing of payment solutions and payments associated with different payment instruments. In some embodiments, the application can make user payments to other entities using payment services through the user device rather than a point-of-sale device. For example, the application can display a store identifier (such as a Quick Response (QR) code generated and sent by a backend server of a third-party financial institution) that can enable proper store selection by the user in a payment process. The application can accept, decrypt, and display the payment confirmation provided by the backend server (e.g., a payment processor system provided by a financial institution), and then send the payment confirmation to the point-of-sale device in the form of an encrypted ultrasonic sound file.

Figure 1:
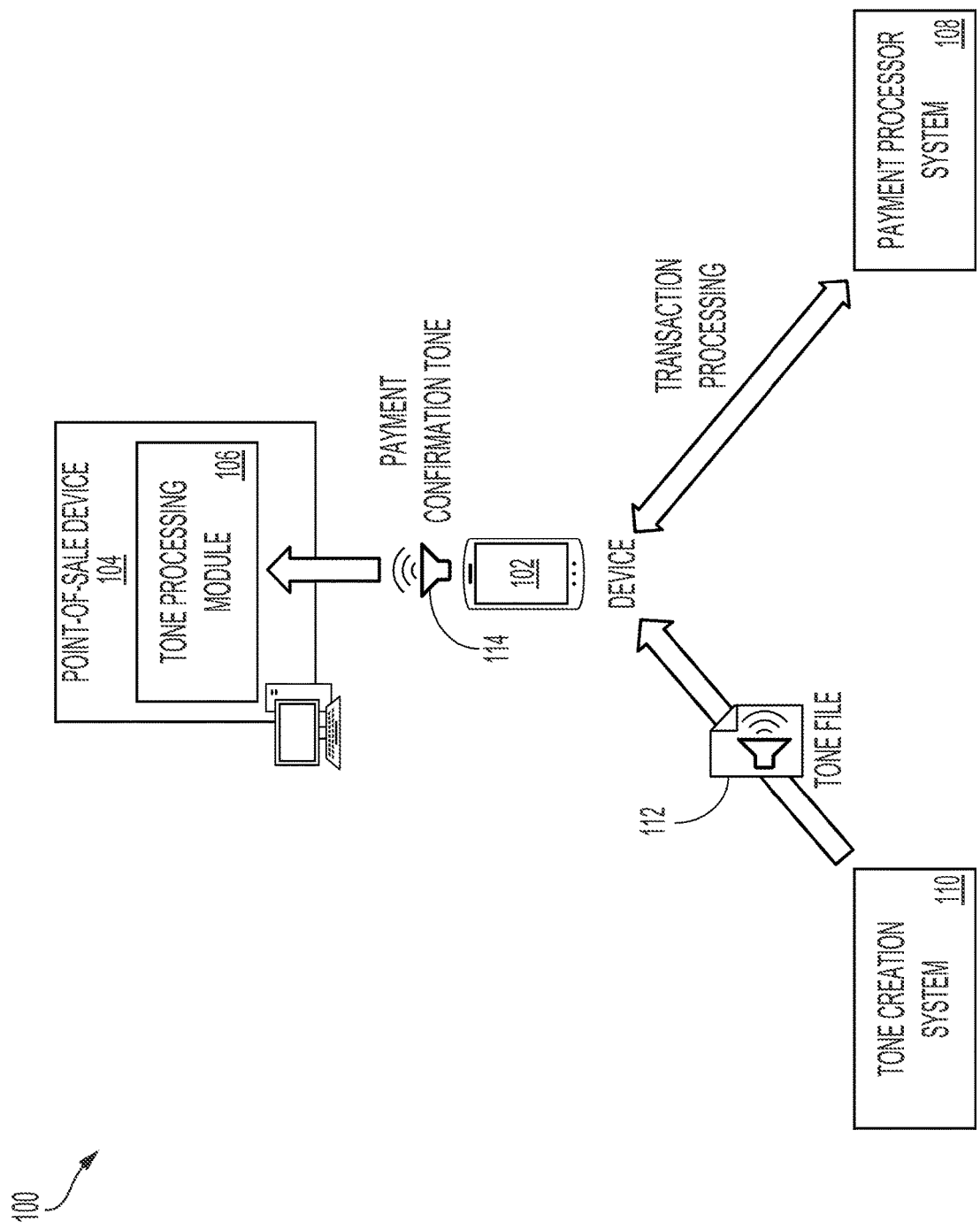
FIG. 1 shows an illustrative example of an environment in which a user device performs a payment transaction with a payment processor system for payment to another entity and transmits an audial tone to a point-of-sale device to provide confirmation of the payment made to the other entity in accordance with at least one embodiment.

FIG. 1 shows an illustrative example of an environment 100 in which a user device 102 performs a payment transaction with a payment processor system 108 for payment to another entity (e.g., a merchant, a retailer, etc.) and transmits an audial tone 114 to a point-of-sale device 104 to provide confirmation of the payment made to the other entity in accordance with at least one embodiment. In the environment 100, a user associated with another entity can utilize their user device 102 to initiate a payment transaction with the other entity at a point-of-sale (e.g., store, office, kiosk, etc.). For example, an entity at the point-of-sale may present the user with a total for items that the user wishes to purchase from the entity and/or for services rendered by the entity. In response to being presented with this total, the user, using their user device 102, may execute an application to obtain identifying information associated with the entity and other information related to the present transaction (e.g., the total amount owed, a description of the items/services provided by the entity, etc.) that may be used to create a payment transaction with the entity via a payment processor system 108.

The application may be provided by the payment processor system 108 or other entity that implements the payment processor system 108, such as a financial institution through which the user may maintain a financial account (e.g., credit account, checking or savings account, etc.). For instance, the user may download the application from the payment processor system 108 in order to enable reverse terminal payments to other entities that may also be associated with the payment processor system to obtain payments submitted by participating users. The user device 102 may include a smartphone, a smartwatch, a laptop computer, a tablet computer, or any other computing device that may be used as described herein for processing payment transactions between a user and another entity and submitted through a payment processor system 108. In an embodiment, the application may be linked to a user account associated with the payment processor system 108. For instance, when accessing the application using the user device 102, the user may be prompted to provide credential information (e.g., username, password, one-time password, biometric information, cryptographic key, etc.) that may be used to authenticate the user and determine whether the user is authorized to submit payments to other entities through the reverse terminal payment process described herein. If the user is successfully authenticated and is authorized to submit payment requests, the payment processor system 108 may allow the application to submit payment requests on behalf of the user.

In an embodiment, the application can interact with one or more peripheral devices of the user device 102 to communicate with a point-of-sale device 104 to obtain information associated with the other entity (e.g., entity that implements the point-of-sale device 104, etc.) and other information related to the present transaction. For example, the application may activate a microphone implemented on the user device 102 to detect any audial signals transmitted from the point-of-sale device 104. As another example, the application may activate a camera or other scanning element of the user device 102 to capture a QR code, bar code, and/or other scannable objects at the point-of-sale.

In an embodiment, the point-of-sale device 104 is enabled via a combination of hardware and software solutions. For instance, the point-of-sale device 104 may comprise a single-board computing device that is associated with the other entity and includes a microphone, speaker, light-emitting diode (LED), a liquid crystal display (LCD) screen, and the like. Once a transaction between the other entity and the user at the point-of-sale has been initiated, the user may utilize the application executed on the user device 102 to establish a connection with the point-of-sale device 104 in order to obtain information associated with the other entity (e.g., entity name, entity address, etc.) and any applicable transaction information (e.g., the total amount owed, a description of the items/services provided by the other entity, etc.). In an embodiment, the application transmits an ultrasonic tone to the point-of-sale device 104 to establish a connection with the point-of-sale device 104 in order to obtain information associated with the other entity and, in some instances, transaction information for the current transaction. For instance, the user device 102, through the application, may submit an application programming interface (API) call to a tone creation system 110 to obtain a unique ultrasonic tone that may uniquely represent the user device 102.

It should be noted that while ultrasonic tones and corresponding detection methods are used throughout the present disclosure for the purpose of illustration, other types of tones may be used. For instance, additionally or alternatively, the application may transmit an infrasonic or subsonic tone to the point-of-sale device 104 to establish a connection with the point-of-sale device 104. As another example, the application may transmit a unique audible tone having a frequency at either the upper or lower limit of human audibility such that it would be difficult for a human to hear the unique audible tone when transmitted from the user device 102 to the point-of-sale device 104. Thus, the tone transmitted by the user device 102 may be generated using different wave (e.g., sound) frequencies.

The tone creation system 110 may be implemented using a computer system or other process implemented on a computer system that is configured to automatically generate tone files or signatures that may be used to generate an audial tone that securely encodes particular information. For instance, in response to the API call from the application executed on the user device 102, the tone creation system 110 may generate a tone file that encodes information corresponding to the user device 102 (e.g., user device make/model, user information, account information associated with the payment processor system 108, etc.). In some instances, the tone creation system 110 may be configured to obtain user authentication information associated with the payment processor system 108 to ensure that the API call is submitted by the user for the purpose of processing a transaction between the user and another entity or is otherwise being submitted in association with the payment processor system 108.

In an embodiment, the tone creation system 110 implements data-over-audio technology, such as that provided by ultrasonic data transmission technology (e.g., LISNR®, etc.). For instance, the tone creation system 110 may be implemented to generate tone files that may be used to generate ultrasonic audial tones that encodes certain information as requested by users. These audial signals may be transmitted using standard speaker systems, such as a speaker implemented on user device 102 and the point-of-sale device 104. Further, these audial signals may be configured to be detectable using standard microphones, such as a microphone implemented on the user device 102 and the point-of-sale device 104. In some instances, the tone creation system 110 can provide a software development kit (SDK) that may be implemented to generate and process these audial signals. For example, the application executed on the user device 102 may implement this SDK to convert the audial file from the tone creation system 110 into an audial tone that may be broadcast using the speaker(s) of the user device 102. Further, the SDK may be used by the application to demodulate any audial tones broadcast by the point-of-sale device 104 to the user device 102, as described herein.

In an embodiment, the point-of-sale device 104 implements a tone processing module 106 that can utilize the SDK provided by the tone creation system 110 to demodulate audial tones broadcast from user devices, such as user device 102 and to generate audial tones that may be broadcast from the point-of-sale device 104 to these user devices. In an embodiment, the tone processing module 106 maintains an algorithmic library that is used to determine the expected characteristics of a next audial tone that is to be processed by the tone processing module 106 for the point-of-sale device 104 in order to prevent replay attacks. For instance, using the algorithmic library, the tone processing module 106 may determine one or more characteristics of the expected next audial tone from a user device 102 such that if the user device 102 replays the same audial tone within a particular period of time, the tone processing module 106 may automatically reject the audial tone as being a replayed tone.

In an embodiment, in response to receiving, from the tone creation system 110, a tone file corresponding to the user device 102, the application may utilize the SDK provided by the tone creation system 110 to generate an audial tone that may be broadcast to the point-of-sale device in order to establish a connection with the point-of-sale device 104. The audial tone generated by the application may encode information that uniquely identifies the user device 102, which may be processed by the tone processing module 106 of the point-of-sale device 104 to identify the user device 102 and to generate, in response, another audial tone that may be broadcast to the user device 102. In an embodiment, the audial tone generated by the application may encode authentication information that may be used to establish a secure communications session between the user device 102 and the point-of-sale device 104. For instance, the audial tone may encode a shared secret, a cryptographic key, or other encrypted information that may be used by the tone processing module 106 to uniquely identify and authenticate the user device 102 for the transaction. Similarly, the audial tone generated by the tone processing module 106 and broadcast to the user device 102 may encode authentication information of the point-of-sale device 104 that may be processed by the application to verify that the information provided by the point-of-sale device 104 is legitimately from the point-of-sale device 104.

In an embodiment, once it is determined that a secure communications session can be established between the user device 102 and the point-of-sale device 104, the user device 102 and the point-of-sale device 104 can establish a secure communications session through use of one or more communications protocols. For instance, the user device 102 and the point-of-sale device 104 may establish a secure communications session using a short-range wireless technology, such as Bluetooth® or Near-Field Communication (NFC) protocols. In some instances, if the point-of-sale device 104 implements one or more wireless network protocols (e.g., Wi-Fi, etc.), the user device 102 may access a wireless network associated with the point-of-sale device 104 subject to these one or more wireless protocols.

It should be noted that while audial tones are described extensively throughout the present disclosure for the purpose of illustration, other communications methods may be implemented to securely transmit information between the user device 102 and the point-of-sale device 104. For instance, the user device 102 and the point-of-sale device 104 may utilize other short-range wireless signals (e.g., Bluetooth® signals, NFC signals, etc.) and/or other wireless network signals (e.g., Wi-Fi signals, etc.) to encode information that may be securely processed by the user device 102 and the point-of-sale device 104 in order to support a payment transaction between a user and another entity, as described herein.

In some examples, the tone processing module 106 may continuously transmit an audial tone that may encode information corresponding to the point-of-sale device 104 and the other entity associated with the point-of-sale device 104. This information, for instance, may include the name of the other entity, the address of the other entity, contact information of the other entity, description of goods and/or services provided by the other entity, any identifying information of the point-of-sale device 104 (e.g., serial number, version number, etc.), and the like. The user device 102, through the application implemented on the user device 102, may activate the microphone of the user device 102 to detect and receive the audial tone broadcast by the point-of-sale device 104 to obtain the information corresponding to the point-of-sale device 104 and the other entity.

In an embodiment, if the user device 102 is able to establish a secure communications session with the point-of-sale device 104, the point-of-sale device 104 can transmit payment information to the user device 102 that may be used to determine a payment that is to be provided to the other entity. The payment information may include an invoice, bill, or other information indicating an amount owed to the other entity by the user. Further, the payment information may include additional details regarding the transaction, such as any goods and/or services rendered, identifying information about the other entity, insurance information associated with the user, and the like. The payment information may be transmitted by the point-of-sale device 104 using an audial tone that may be obtained and demodulated by the user device 102 via the application executed on the user device 102. For instance, in response to detecting and receiving an audial tone from the point-of-sale device 104, the application may utilize the SDK provided by the tone creation system 110 to demodulate the audial tone and decode the payment information provided by the point-of-sale device 104 for the payment transaction. The application may present the payment information to the user via a display element of the user device 102 to allow the user to review the payment information and verify the amount that is to be paid to the other entity in the transaction prior to sending a payment transaction request to the payment processor system 108.

In an embodiment, the point-of-sale device 104 implements a machine learning algorithm or artificial intelligence that is configured to automatically, and dynamically, generate customized offers that may be made available to the user based on the information provided by the application that uniquely identifies the user device 102 and the payment information. The machine learning algorithm implemented by the point-of-sale device 104 may be trained using supervised learning techniques to generate or otherwise identify offers that may be made available to the user along with the payment information for the present transaction. For instance, the machine learning algorithm may be trained using sample user information, sample payment information (e.g., payment amount, description of goods and/or services rendered by another entity, etc.), corresponding offers, and feedback associated with these offers (e.g., acceptance of offers, rejection of offers, etc.). An offer may include a coupon, a sales promotion, an upsell, and the like.

As an illustrative example of the training of the machine learning algorithm or artificial intelligence implemented on the point-of-sale device 104, an evaluator of the machine learning algorithm or artificial intelligence may review the offers generated by the machine learning algorithm or artificial intelligence to determine whether the offers are germane to the corresponding transactions for which the offers were presented. To determine whether these offers are germane to these corresponding transactions, the evaluator may evaluate user feedback corresponding to the presentation of these offers. This feedback may include acceptance or rejection of presented offers, as well as any explicit feedback provided by a user (e.g., comments provided by users with regard to presented offers, selection of an option regarding their selection or rejection of the offer, etc.). In some instances, an evaluator may act as a user or other entity that utilizes their user device 102 to interact with the point-of-sale device 104 in association with a particular transaction and during which an offer may be presented to the evaluator for the transaction. The evaluator may review the offer provided by the point-of-sale device 104 based on the user information provided and the present transaction to determine whether the offer provided is germane to the transaction or is otherwise appealing to the evaluator. Based on the evaluator's feedback, the machine learning algorithm may be re-trained and/or reinforced to improve the likelihood of the point-of-sale device 104 providing germane offers that may be appealing to users.

Training of the machine learning algorithm may also be performed in real-time and as transactions occur between the user devices (e.g., the user device 102, other user devices, etc.), the point-of-sale device 104, and the payment processor system 108. For instance, if the point-of-sale device 104 transmits, in addition to the payment information, an offer to the user device 102, the application may present the payment information and the offer to the user via the display element of the user device 102 to allow the user to review the payment information and the offer. Through the user device 102, the user may determine whether to accept or reject the offer. The user's acceptance or rejection of the offer may be indicated in the payment transaction request that is transmitted to the payment processor system 108. For example, if the offer includes a coupon that may be applied to the transaction in order to reduce the payment required from the user, the payment transaction request may indicate the original payment information for the transaction, as well as information corresponding to the application of the offered coupon (e.g., applicable coupon code, updated invoice that reflects the new payment amount required for the transaction, indication of an applied discount as a result of acceptance of the offer, etc.). Additionally, the application, through the user device 102, may transmit an audial tone that encodes data corresponding to the user's acceptance of the offer. In response to this audial tone, the point-of-sale device 104 may demodulate the audial tone to obtain the user feedback with regard to the offer. The point-of-sale device 104 may use this feedback, as well as the payment information for the transaction and the offer provided to the user, as a new data point that may be used to reinforce or otherwise re-train the machine learning algorithm used to generate the offer. Thus, as users interact with the point-of-sale device 104 and the payment processor system 108, the machine learning algorithm or artificial intelligence may be dynamically trained in real-time based on users' acceptance or rejection of presented offers.

In an embodiment, if the application is unable to establish a secure communications session with the point-of-sale device 104 or is otherwise unable to process audial tones from the point-of-sale device 104 (e.g., the microphone on the user device 102 is disabled, the application does not have access to the SDK, etc.), the application may prompt the user to utilize the user device 102 to scan a QR code or other scannable item (e.g., bar code, etc.) that may be used to obtain information about the other entity that may be used to define a new payment transaction request. For instance, if the application is not able to establish a secure communications session with the point-of-sale device 104, the application may provide the user with an option to activate a camera or other scanning device on the user device 102 to capture the QR code or other scannable item at the point-of-sale. This QR code or other scannable item may encode identifying information associated with the other entity (e.g., name of the other entity, address associated with the other entity, etc.) as well as any identifying information of the point-of-sale device 104 (e.g., serial number, version number, etc.) that may be used to determine the characteristics of the audial tone that is to be generated by the application to provide payment confirmation information to the point-of-sale device 104.

In some instances, if the application is unable to establish a secure communications session with the point-of-sale device 104 to retrieve any payment information and identifying information associated with the other entity, the application may allow the user of the user device 102 to manually enter this information. For instance, the application may allow the user to manually define the other entity that is to receive the payment, any details regarding the purpose of the payment, and the payment amount. In an embodiment, if the application is able to obtain identifying information associated with the other entity from the point-of-sale device 104 (e.g., through an audial tone, through scanning a QR code/other scannable item, etc.) but no payment information is provided by the point-of-sale device 104, the application can provide the user with an option to manually enter any payment information for the present transaction (e.g., payment amount, description of goods and/or services rendered by the other entity, etc.) that may be used to supplement the obtained identifying information associated with the other entity.

In an embodiment, once the application has obtained the required identifying information associated with the other entity and payment information for the present transaction (e.g., through the audial tone broadcast by the point-of-sale device 104, through a scan of a QR code/other scannable item at the point-of-sale, through manual user entry, etc.), the application may transmit the identifying information associated with the other entity and payment information to the payment processor system 108 to initiate payment to the other entity for the transaction. In some instances, the application may further provide authentication information that may be used by the payment processor system 108 to authenticate the application and the user of the user device 102. For instance, the application may prompt the user to provide credential information that may be associated with a user account maintained by the payment processor. This credential information may include a username, a password, a one-time password, biometric information, cryptographic key(s), and the like. In some instances, if the payment processor system 108 is able to authenticate the user, the payment processor system 108 can identify one or more payment methods that may be used for the payment transaction. For instance, the user account associated with the user may indicate one or more payment methods that may be used for payments to other entities. These one or more payment methods may include lines of credit (e.g., credit card accounts, etc.), checking/savings accounts (through one or more financial institutions), loyalty or rewards program points, digital wallets associated with one or more cryptocurrencies, and the like. In some instances, the user may indicate that they would like to utilize any combination of their available payment methods for the payment that is to be submitted to the other entity. For instance, the user may define, through the application, that they would like to pay for a portion of the transaction using a line of credit and the remaining portion using their designated checking account. This may provide the user with significant flexibility in determining how payment is to be provided to the other entity for the present transaction.

As noted above, the payment processor system 108 may be implemented by a financial institution through which the user may maintain one or more financial accounts (e.g., credit account, checking or savings account, etc.). The payment processor system 108 may thus be implemented as a computer system or process executed on a computer system provided by the financial institution for the processing of payments to other entities, such as merchants, service providers, vendors, and the like, on behalf of users. Based on the selected payment method(s), the payment processor system 108 can obtain the required payment from the user that is to be used to pay the other entity for the present transaction. For instance, if the user selects one or more payment methods associated with the financial institution that implements the payment processor system 108, the payment processor system 108 may access the user accounts corresponding to these one or more payment methods to obtain the required payment. Additionally, or alternatively, if the user has indicated that one or more accounts not associated with the financial institution that implements the payment processor system 108 are to be used for payment, the payment processor system 108 may access any other financial institution associated with these one or more accounts in order to obtain the necessary payment for the transaction. For example, if the user has selected a checking or savings account associated with another financial institution for payment, the payment processor system 108 may obtain this payment electronically from this other financial institution, such as through an electronic funds transfer (EFT), an automated clearing house (ACH), and the like.

In an embodiment, the payment processor system 108 implements a machine learning algorithm or artificial intelligence that is configured to automatically, and dynamically, recommend one or more payment methods that may be used for the payment transaction. The machine learning algorithm or artificial intelligence may be trained using sample payment transactions, including user information and identifying information associated with the other entity, as well as payment methods that may be available to the user. The user information may include any payment methods utilized by the user for the transaction, including payment methods corresponding to active accounts associated with the payment processor system 108 and any other payment methods corresponding to other financial institutions (e.g., a user's bank, etc.). The sample payment transactions may include historical payment transactions corresponding to previously processed payment transactions amongst different users and other entities over time. Additionally, the sample payment transactions may include hypothetical transactions generated by evaluators of the machine learning algorithm or artificial intelligence in order to further train or reinforce the machine learning algorithm or artificial intelligence. These hypothetical transactions may correspond to possible transactions for which a desired outcome (e.g., recommendations of particular payment methods and/or types of payment methods) is expected.

In response to obtaining identifying information associated with the other entity and payment information for the pending transaction, the payment processor system 108 may access a user account associated with the user to identify one or more payment methods that may be used for payments to other entities. These one or more payment methods, as well as the identifying information associated with the other entity and payment information and historical data corresponding to previous transactions, may be used as input to the machine learning algorithm or artificial intelligence to obtain, as output, a recommendation that indicates one or more payment methods that may be used for completing the transaction and that may be presented to the user. For instance, if the user routinely uses their savings account or a line of credit provided by the financial institution that implements the payment processor system 108 for similar transactions, the machine learning algorithm or artificial intelligence may generate a recommendation that indicates these particular payment methods. This recommendation may be provided by the payment processor system 108 to the user via the application implemented on the user device 102. In addition to the recommendation, the payment processor system 108 may provide the user with one or more options to utilize alternative payment methods for the transaction. For example, these one or more options may correspond to other payment methods indicated in the user account but that are otherwise not indicated in the provided recommendation. Further, the one or more options may correspond to other common forms of payment that may be provided (e.g., lines of credit associated with other financial institutions, other checking or savings accounts, etc.).

The user's selection of one or more payment methods (whether from the provided recommendation or from the one or more other options provided by the payment processor system 108) may be used to re-train or otherwise update the machine learning algorithm or artificial intelligence. For instance, if the user has selected a payment method from the one or more payment methods indicated in the provided recommendation, the payment processor system 108 may use the user's selection of the payment method to reinforce the machine learning algorithm or artificial intelligence. This may increase the likelihood of the machine learning algorithm or artificial intelligence recommending this payment method to the user and to other similarly situated users for similar transactions. Alternatively, if the user selects an alternative payment method, whereby the user rejects the recommendation provided by the payment processor system 108, the payment processor system 108 may use the user's selection of the alternative payment method to re-train the machine learning algorithm or artificial intelligence. This may decrease the likelihood of the machine learning algorithm or artificial intelligence recommending the one or more payment methods rejected by the user while increasing the likelihood of the selected payment method being recommended to the user and to other similarly situated users for similar transactions.

In an embodiment, the machine learning algorithm or artificial intelligence can also be used to determine whether to extend an offer to open a line of credit that may be used for the pending transaction. For instance, the identifying information associated with the other entity and the payment information, as well as information from the user account associated with the user, may be used as input to the machine learning algorithm or artificial intelligence to generate an output that indicates whether an offer to apply for a line of credit should be extended to the user. Based on the output of the machine learning algorithm or artificial intelligence, the payment processor system 108 may determine whether to extend an offer for a new line of credit that may be used for the transaction. The offer for the new line of credit may be proffered to the user through the application implemented on the user device 102, whereby the user may be provided with an application or invitation to apply for the new line of credit. The user may determine whether to complete the application or otherwise accept the invitation to apply for the new line of credit in order to apply for the new line of credit or to reject the application/invitation to apply for the new line of credit and select an alternative payment method for the present transaction. If the user rejects the application or invitation to apply for the new line of credit, the payment processor system 108 may use this feedback to re-train the machine learning algorithm or artificial intelligence. This may decrease the likelihood of the machine learning algorithm or artificial intelligence recommending a new line of credit to the user or other similarly situated users for similar transactions. Alternatively, if the user submits a completed application or otherwise accepts the invitation to apply for a new line of credit, the payment processor system 108 may use this response to reinforce the machine learning algorithm or artificial intelligence.

If the response from the user includes a completed application for a new line of credit, the payment processor system 108 may provide the completed application to a management system associated with the financial institution (not shown). The management system may utilize the information provided in the completed application to perform a more detailed (e.g., hard) credit worthiness check to determine whether the user can be approved for the new line of credit and, if so, the amount of the line of credit. The management system may indicate, to the payment processor system 108, whether the user has been approved for the new line of credit and the corresponding amount of the new line of credit. Based on the amount of the line of credit, the payment processor system 108 may determine whether this amount is sufficient for the pending transaction. For instance, if the payment amount for the pending transaction exceeds the amount of the line of credit, the payment processor system 108 may determine that the new line of credit cannot be used to completely fulfill the pending transaction. This may result in the payment processor system 108 providing an indication to the user to provide an alternative payment method that may be used in conjunction with the new line of credit or as a different form of payment for the pending transaction. Alternatively, if the payment processor system 108 determines that the new line of credit is sufficient for the pending transaction, the payment processor system 108 may process the transaction using the new line of credit.

In an embodiment, the machine learning algorithm or artificial intelligence implemented by the payment processor system 108 can be further dynamically trained to generate and provide coupons and/or other offers corresponding to the goods and/or services for which payment is being provided. The machine learning algorithm or artificial intelligence utilized to generate these coupons and/or other offers may be trained using a similar method as described above in connection with the machine learning algorithm or artificial intelligence implemented by the point-of-sale device 104. For example, the machine learning algorithm or artificial intelligence may be trained using supervised learning techniques to generate or otherwise identify offers that may be made available to the user in response to receiving the transaction information from the user device 102. For instance, the machine learning algorithm or artificial intelligence may be trained using sample user information, sample payment information (e.g., payment amount, description of goods and/or services rendered by another entity, etc.), corresponding offers, and feedback associated with these offers (e.g., acceptance of offers, rejection of offers, etc.). As noted above, the offer that may be provided by the payment processor system 108 to the user may include a coupon, a sales promotion, an upsell, and the like.

Similar to the training of the machine learning algorithm or artificial intelligence implemented by the point-of-sale device 104, an evaluator of the machine learning algorithm or artificial intelligence implemented by the payment processor system 108 may review the offers generated by the machine learning algorithm or artificial intelligence to determine whether the offers are germane to the corresponding transactions for which the offers were presented. To determine whether these offers are germane to these corresponding transactions, the evaluator may evaluate user feedback corresponding to the presentation of these offers. This feedback may include acceptance or rejection of presented offers, as well as any explicit feedback provided by a user (e.g., comments provided by users with regard to presented offers, selection of feedback options regarding their selection or rejection of the offer, etc.). In some instances, an evaluator may act as a user or other entity that utilizes their user device 102 to transmit transaction information corresponding to a particular transaction to the payment processor system 108. In response to this transaction information, the machine learning algorithm or artificial intelligence implemented by the payment processor system 108 may generate an offer that may be presented to the evaluator through their user device. The evaluator may review this offer based on the transaction information provided to determine whether the offer provided is germane to the present transaction or is otherwise appealing to the evaluator. Based on the evaluator's feedback, the machine learning algorithm or artificial intelligence may be re-trained and/or reinforced to improve the likelihood of the payment processor system 108 providing germane offers that may be appealing to users.

The machine learning algorithm or artificial intelligence implemented by the payment processor system 108 may be trained in real-time and as the transaction is occurring between the user device 102, the point-of-sale device 104, and the payment processor system 108. For instance, as the transaction information provided by the user device 102 is being processed by the payment processor system 108, the application implemented on the user device 102 may present an offer provided by the payment processor system 108 via the display element of the user device 102 to allow the user to review the offer. Through the user device 102, the user may determine whether to accept or reject the offer. The user's acceptance or rejection of the offer may be indicated in a response transmitted to the payment processor system 108. For example, if the offer includes a coupon that may be applied to the transaction in order to reduce the payment required from the user, the application may transmit a response to the payment processor system 108 to indicate that the user has accepted the provided offer. The payment processor system 108 may dynamically, and in real-time, generate new transaction information that may be presented to the user via the user device 102. This new transaction information may indicate a new payment amount, a new invoice, new or alternative payment methods, any applied discounts, and the like according to the type of offer accepted by the user. For example, if the offer is for a new line of credit that the user is approved for, the payment processor system 108 can dynamically update the transaction information to indicate that payment is to originate from this new line of credit as opposed to any other one or more payment methods previously selected by the user. As another illustrative example, if the offer includes an upsell, whereby the user is offered an upgrade to goods or services purchased at the point-of-sale, the payment processor system 108 can dynamically update the transaction information to provide a new invoice that incorporates the accepted upsell (e.g., upgrade options, additional goods and/or services, etc.) and any new pricing information. The user may review the new invoice via the user device 102 and determine whether to agree to payment according to the new invoice or to reject the updated invoice and revert back to the original transaction.

The user's response to the offer provided by the payment processor system 108 may serve as feedback that may be used to re-train the machine learning algorithm or artificial intelligence implemented by the payment processor system 108. For instance, the payment processor system 108 may use this feedback, as well as the payment information (whether updated in response to the offer or as originally provided) for the transaction and the offer provided to the user, as a new data point that may be used to reinforce or otherwise re-train the machine learning algorithm or artificial intelligence used to generate the offer. Thus, as users submit transaction information and interact with the payment processor system 108, the machine learning algorithm or artificial intelligence may be dynamically trained in real-time based on users' acceptance or rejection of presented offers.

In an embodiment, once the payment processor system 108 has obtained the necessary payment from the user for the transaction, the payment processor system 108 can transfer the payment to an account associated with the other entity or otherwise make the payment available to the other entity through any method as indicated by the other entity (e.g., transfer to a banking account associated with the other entity, delivery of a physical check or other payment instrument, conversion to a cryptocurrency and transfer to a digital wallet associated with the other entity, etc.). Further, the payment processor system 108 may generate a payment confirmation notification indicating that the payment to the other entity has been successfully processed. The payment confirmation may indicate the recipient of the payment (e.g., the other entity, an account associated with the other entity, a third-party associated with the other entity, etc.), the payment amount, a unique confirmation identifier (e.g., an alphanumeric string, a cryptographic hash, etc.), and the like. Further, the payment confirmation may include identifying information of the payment processor system 108 and/or of the financial institution that implements the payment processor system 108. This identifying information may include a unique identifier (e.g., an alphanumeric string, a cryptographic hash, etc.) corresponding to the payment processor system 108 and/or to the financial institution that implements the payment processor system 108.

In an embodiment, the payment processor system 108 can determine one or more characteristics of an audial tone (e.g., frequency, pitch, amplitude, pattern, etc.) that may be used to broadcast the payment confirmation to the point-of-sale device 104. As noted above, the application can provide to the payment processor system 108 identifying information corresponding to the point-of-sale device 104 used by the other entity. Using this identifying information, the payment processor system 108 can determine what algorithmic library is implemented on the point-of-sale device 104 and calculate what characteristics of an audial tone are to be expected in order for the point-of-sale device 104 to authenticate the audial tone for receiving a payment confirmation from the user device 102. These characteristics may be provided with the payment confirmation to the user device 102, which the application may provide to the tone creation system 110 for the creation of an audial tone that encodes the payment confirmation and has the specified characteristics.

Once the payment processor system 108 has completed transferring payment to the other entity for the present transaction, the payment processor system 108 may transmit the payment confirmation and the characteristics of the audial tone that is to be generated to provide the payment confirmation to the point-of-sale device 104 to the user device 102. In response to receiving the payment confirmation and the audial tone characteristics for delivery of the payment confirmation, the application executed on the user device 102 may transmit an API call to the tone creation system 110 to generate a tone file 112 that may be used to produce an audial tone that encodes the payment confirmation and has the required characteristics to ensure acceptance of the delivery confirmation by the point-of-sale device 104. The API call may include the payment confirmation provided by the payment processor system 108, identifying information corresponding to the user device 102 and/or the user (e.g., device serial number, application serial number, user contact information, etc.), as well as the characteristics defined by the payment processor system 108 for the audial tone that is to be generated for the point-of-sale device 104.

In response to the API call from the application executed on the user device 102, the tone creation system 110 may generate a tone file 112 that may be processed by the application executed on the user device 102 to generate the audial tone that is to be broadcast to the point-of-sale device 104. The tone file 112 may include executable instructions that, when executed by the application using the SDK provided by the tone creation system 110, may cause the user device 102 to generate an audial tone that encodes the payment confirmation and the identifying information corresponding to the user device 102 and/or the user. Further, the audial tone may be generated to have the characteristics defined by the payment processor system 108 such that the audial tone may be accepted and authenticated by the point-of-sale device 104. The tone creation system 110 may transmit the tone file 112 to the user device 102, which may process the tone file 112 using the SDK provided by the tone creation system 110.

In an embodiment, the application executed on the user device 102 utilizes the SDK provided by the tone creation system 110 and the tone file 112 to broadcast an audial tone 114 that encodes the payment confirmation provided by the payment processor system 108 and other information that may be used to authenticate the audial tone 114 (e.g., identifying information corresponding to the user device 102 and/or user, etc.). For instance, the application may utilize one or more speakers on the user device 102 to broadcast the audial tone 114 to the point-of-sale device 104. In some instances, the application may determine whether the user device 102 is within an audible range of the point-of-sale device 104 in order to ensure that the audial tone 114 may be received by the point-of-sale device 104. For example, if the point-of-sale device 104 continuously emits an audial tone to denote its presence and to broadcast identifying information associated with the other entity, the application, using a microphone on the user device 102, may determine whether it detects this audial tone from the point-of-sale device 104. If so, the application may determine that the point-of-sale device 104 is within audible range of the user device 102 and can receive the audial tone 114. In some instances, the application may broadcast a ping or other test audial tone that may be used to determine whether the point-of-sale device 104 is within audible range of the user device 102. For instance, the ping or other test audial tone, when received by the point-of-sale device 104, may cause the point-of-sale device 104 to broadcast a response tone that may be processed by the application to determine that the point-of-sale device 104 is within audible range of the user device 102.

If the application determines that the user device 102 is not within audible range of the point-of-sale device 104, the application may prompt the user to move towards the point-of-sale device 104 in order for the user device 102 to be within audible range of the point-of-sale device 104. Once the application detects that the user device 102 is within audible range of the point-of-sale device 104, the application may utilize the received tone file 112 and the SDK provided by the tone creation system 110 to generate and broadcast the audial tone 114. As noted above, this audial tone 114 may have the characteristics defined by the payment processor system 108 such that the audial tone 114 may be authenticated by the point-of-sale device 104. Further, as noted above, the audial tone 114 may encode the payment confirmation and any other information that may be used to authenticate the audial tone 114 (e.g., identifying information corresponding to the user device 102 and/or user, etc.).

In an embodiment, the audial tone 114 is detected by the point-of-sale device 104 using a tone processing module 106. The tone processing module 106 may be implemented as a microcontroller on the point-of-sale device 104 and may be configured to process received audial tones to determine their authenticity and to retrieve any information encoded within these audial tones. The tone processing module 106 may implement the SDK provided by the tone creation system 110 in order to receive, authenticate, and demodulate audial tones received by the point-of-sale device 104. Additionally, the tone processing module 106 may implement an algorithmic library that may be used to authenticate audial tones based on the expected characteristics of these audial tones. For instance, the algorithmic library may implement a time-based algorithm that may automatically generate expected audial signal characteristics based on the current time. This time-based algorithm may also be maintained by the payment processor system 108 and the tone creation system 110 in order to generate an audial tone 114 that has the correct set of characteristics that may be used to authenticate the audial tone 114. Alternatively, the algorithmic library may implement an algorithm that limits the number of times an audial tone having a particular set of characteristics may be processed by the point-of-sale device 104. For instance, if an audial tone is received with a particular set of characteristics, the tone processing module 106 may automatically reject any subsequent audial tones having this particular set of characteristics permanently or for a particular period of time (e.g., a day, a week, etc.). These algorithms may prevent replay attacks, whereby audial tones may be mimicked to transmit repeated payment confirmations. As such, the tone processing module 106 may automatically reject any audial tone that does not have the expected characteristics, as determined using the algorithmic library. Further, the tone processing module 106 may automatically reject any audial tone that has a particular set of characteristics previously detected by the tone processing module 106 over a particular period of time, a particular number of times, or at all according to the implementation of the algorithmic library.

In response to receiving the audial tone 114 from the user device 102, the tone processing module 106 may evaluate the audial tone 114 to determine its authenticity and to otherwise determine whether the audial tone 114 may be processed. For instance, using the aforementioned algorithmic library, the tone processing module 106 may determine whether the received audial tone 114 has an expected set of characteristics (e.g., frequency, pitch, amplitude, pattern, etc.). If the tone processing module 106 determines that the received audial tone 114 does not have the expected set of characteristics, the tone processing module 106 may automatically reject the audial tone 114. In some instances, if the audial tone 114 is rejected, the tone processing module 106 may cause the point-of-sale device 104 to provide an indication of this rejection. For instance, the tone processing module 106 may cause the point-of-sale device 104 to activate an LED on the point-of-sale device (e.g., turn on, flash, etc.) that serves as an indication of the rejection of the audial tone 114. As an illustrative example, if the audial tone 114 is rejected by the tone processing module 106, the point-of-sale device 104 may activate a red LED on the point-of-sale device 104 to indicate that the audial tone 114 was rejected. As another illustrative example, the tone processing module 106 may cause the point-of-sale device 104 to emit an audible sound that may be understood by the user as an indication that the audial tone 114 was rejected (e.g., a buzzer, a losing horn, etc.). Additionally, or alternatively, if the point-of-sale device 104 includes a display element, such as an LCD screen or monitor, the tone processing module 106 may cause the point-of-sale device 104 to display a message to the user that the audial tone 114 was rejected. In some instances, the point-of-sale device 104 may transmit a notification to the user device 102 to indicate that the audial tone 114 was rejected.

If the audial tone 114 is rejected by the tone processing module 106, the application may transmit a notification to the payment processor system 108 to indicate that payment confirmation could not be provided to the other entity via the point-of-sale device 104. Accordingly, the payment processor system 108 may utilize one or more other methods to communicate the payment confirmation to the other entity. For instance, the financial institution that implements the payment processor system 108 may contact the other entity (e.g., e-mail, telephone, etc.) to indicate that a payment has been received for the transaction and that the payment has been transferred to the designated entity associated with the other entity (e.g., bank account, third-party entity, etc.). In some instances, the payment processor system 108 may reverse the payment made to the other entity and instruct the user, via the application executed on the user device 102, to utilize an alternative payment method for the transaction with the other entity. This may include presenting a payment instrument to the other entity at the point-of-sale for manual entry, using a fiat currency, or arranging an alternative method of payment (e.g., payment installments, a loan, etc.).

In an embodiment, if the audial tone 114 is accepted by the tone processing module 106, the tone processing module 106 can utilize the SDK provided by the tone creation system 110 to demodulate the audial tone 114 and obtain the payment confirmation encoded therein. Further, the tone processing module 106 may automatically evaluate the payment confirmation and any authentication information provided therein to further determine the authenticity of the audial tone 114. For instance, if the authentication information includes a cryptographic hash that corresponds to a unique identifier for the financial institution that implements the payment processor system 108 and to a unique identifier for the payment confirmation, the tone processing module 106 may determine whether it can decrypt the cryptographic hash using a cryptographic key, shared secret, etc. established with the financial institution. In some instances, the point-of-sale device 104 may implement a trusted platform module (TPM) or other secure cryptoprocessor that may be used to decrypt the cryptographic hash and obtain the unique identifier corresponding to the financial institution and the unique identifier for the payment confirmation. The unique identifier for the financial institution may be known to the tone processing module 106 such that decryption of the cryptographic hash may be used to determine the authenticity of the audial tone 114. If the tone processing module 106 is unable to authenticate the payment confirmation provided in the audial tone 114, the tone processing module 106 may reject the audial tone 114 using the methods described above.

If the payment confirmation is successfully authenticated, the tone processing module 106 may cause the point-of-sale device 104 to provide an indication that the payment confirmation has been received and accepted. For instance, the tone processing module 106 may cause the point-of-sale device 104 to activate an LED on the point-of-sale device (e.g., turn on, flash, etc.) that serves as an indication of the receipt and acceptance of the payment confirmation. As an illustrative example, if the payment confirmation is accepted by the tone processing module 106, the point-of-sale device 104 may activate a green LED on the point-of-sale device 104 to indicate that the payment confirmation was accepted. As another illustrative example, the tone processing module 106 may cause the point-of-sale device 104 to emit an audible sound that may be understood by the user as an indication that the payment confirmation was accepted (e.g., a bell, a winning theme, etc.). Additionally, or alternatively, if the point-of-sale device 104 includes a display element, such as an LCD screen or monitor, the tone processing module 106 may cause the point-of-sale device 104 to display a message to the user that the payment confirmation was accepted. This message may include the payment confirmation itself, which the other entity may also review to confirm that payment was received. In some instances, the point-of-sale device 104 may transmit a notification to the user device 102 to indicate that the payment confirmation was successfully received by the point-of-sale device 104.

The implementation of the user device 102 and of the point-of-sale device 104 described above may allow for the point-of-sale device 104 to be implemented without any Internet or other remote network connectivity. For example, the application executed on the user device 102 may facilitate Internet or other remote network connectivity for the point-of-sale device 104 to the payment processor system 108, and the audial tone 114 broadcast by the application through the user device 102 may be used by the point-of-sale device 104 to confirm that a payment transaction has been authorized and completed.

FIGS. 2A-2B show an illustrative example of an environment 200 in which an application executed on a user device 202 engages a microphone or other peripheral device on the user device 202 to detect a tone from a point-of-sale device to establish a connection between the user device 202 and the point-of-sale device in accordance with at least one embodiment. In the environment 200, a user at a point-of-sale (e.g., store, office, kiosk, etc.) may be prompted to execute an application provided by a payment processor (e.g., financial institution associated with one or more user accounts) in order to initiate a payment transaction with another entity at the point-of-sale. For instance, an entity at the point-of-sale may indicate that the user may utilize the application to provide payment for goods sold and/or services rendered to the user. Additionally, or alternatively, the entity may implement, at the point-of-sale, a point-of-sale device that may be provided by the payment processor in order to provide a method for conducting payment transactions through a user's device rather than through a dedicated terminal associated with the entity. The entity may provide instructions to execute the application in order to communicate with the point-of-sale device (e.g., written instructions, spoken instructions, etc.). Additionally, or alternatively, the point-of-sale device may automatically broadcast an audial tone that may be detected by the user device 202. This audial tone may cause the user device 202 to automatically execute the application provided by the payment processor for processing payment transactions on behalf of the entity.

In an embodiment, the application, when executed, can provide the user with an interface 204 through which the user can interact with the application. The application can provide the user with instructions for establishing a secure communications session with the point-of-sale device. For example, as illustrated in FIG. 2A, the application may provide an interface 204 (e.g., a graphical user interface (GUI), etc.) through which the application may instruct the user to activate the microphone on the user device 202 to detect an audial tone being broadcast by the point-of-sale device. As noted above, the application may implement an SDK, provided by a tone creation system, that may be used to demodulate audial tones transmitted by point-of-sale devices and to establish a secure communications session with these point-of-sale devices. Accordingly, the application may require access to the microphone implemented on the user device 202 to detect and process these audial tones. It should be noted that while instructions may be provided to the user to manually activate the microphone on the user device 202, in some instances the application may automatically activate the microphone upon execution without user input or other intervention.

In some instances, the application may provide, through the interface 204, a microphone activation button 208 or other interface element that may be used to grant the application permission to activate the microphone on the user device 202 or to otherwise cause the application to execute one or more instructions that cause the microphone on the user device 202 to be activated. If the user selects the microphone activation button 208, the application may activate the microphone on the user device 202 in order to detect and process any audial tones broadcast by the point-of-sale device. In some instances, the application, through the interface 204, may instruct the user to hold their user device 202 within a particular proximity of the point-of-sale device in order to facilitate detection of the audial tone broadcast by the point-of-sale device using the microphone on the user device 202.

In an embodiment, the application further provides, through the interface, alternative interface elements 210 corresponding to alternative options for collecting identifying information corresponding to another entity for the payment transaction. For example, as illustrated in FIG. 2A, the application may provide through the interface 204 a set of alternative interface elements 210 through which the user can obtain identifying information corresponding to the other entity, which may be necessary for the payment transaction. These alternative interface elements 210 may include a button that, when selected, may cause the application to activate a camera or other scanning element of the user device 202 to scan a QR code (e.g., "Scan QR with Camera") or other element that may encode the required identifying information corresponding to the other entity. Further, these alternative interface elements 210 may include a button that, when selected, may allow the user to manually enter the required identifying information corresponding to the other entity and any other information that may be required for the payment transaction (e.g., "Manually Enter Info"). In some instances, this set of alternative interface elements 210 may be presented simultaneously with the microphone activation button 208 upon execution of the application. Alternatively, in an embodiment, the application can present the set of alternative interface elements 210 in response to a triggering event. For example, the application can present the set of alternative interface elements 210 after a pre-defined period of time has passed without user selection of the microphone activation button 208 and/or without detection of an audial tone from the point-of-sale device.

If the user selects the microphone activation button 208 from the interface 204, the application may dynamically and in real-time update the display of the user device 202 to present, as illustrated in FIG. 2B, interface 206. Through the interface 206, the application may present the user with a status regarding attempts by the application to establish a secure communications session with the point-of-sale device. For example, as illustrated in FIG. 2B, the application may indicate through the interface 206 that it is attempting to connect with the point-of-sale device in order to retrieve identifying information corresponding to the other entity and payment information required for the payment transaction. As noted above, the application may receive, from a tone creation system, a tone file corresponding to the user device 202. In response to user selection of the microphone activation button 208, the application may utilize the SDK provided by the tone creation system to generate an audial tone that may be broadcast to the point-of-sale device in order to establish a connection (e.g., secure communications session) with the point-of-sale device. The audial tone generated by the application may encode information that uniquely identifies the user device 202, which may be processed by the point-of-sale device to identify the user device 202 and to generate, in response, another audial tone that may be broadcast to the user device 202. The audial tones generated by the application and the point-of-sale device may encode authentication information that may be used to establish a secure communications session between the user device 202 and the point-of-sale device. Thus, the application and the point-of-sale device may perform a handshake process using the exchanged authentication information to establish the secure communications session.

In an embodiment, the application can provide, through the interface 206, the set of alternative interface elements 210 as described above. For instance, a user may select an alternative interface element 210 to terminate or otherwise interrupt the attempt by the application to establish a secure communications session with the point-of-sale device using audial tones. As an illustrative example, if the user determines that the application is taking a significant amount of time to establish a secure communications session with the point-of-sale device, the user may select any of the set of alternative interface elements 210 to interrupt the application's attempt to establish the secure communications session with the point-of-sale device and instead utilize an alternative method to obtain the necessary identifying information associated with the other entity and payment information for the transaction. For instance, as described above, the user may select an option to activate a camera or other scanning element of the user device 202 to scan a QR code or other element that may encode the required identifying information associated with the other entity. As another example, the user may select an option to manually enter the required identifying information associated with the other entity and any other information that may be required for the payment transaction.

In an embodiment, the set of alternative interface elements 210 are presented via the interface 206 in response to a triggering event and are not initially presented by the application once the user has selected the microphone activation button 208. For instance, the application may present the set of alternative interface elements 210 if the secure communications session with the point-of-sale device has not been established after a pre-defined period of time starting from user selection of the microphone activation button 208. As another example, the application may present the set of alternative interface elements 210 in response to an indication that the secure communications session cannot be established with the point-of-sale device. For instance, if the application does not detect an audial tone from the point-of-sale device, the application may determine that the point-of-sale device is unable to establish or partake in the secure communications session and, thus, the user may be required to obtain the identifying information associated with the other entity and payment information through alternative methods, as described above.

In some instances, if the application is unable to detect an audial tone from the point-of-sale device or is otherwise having difficulty in establishing a secure communications session with the point-of-sale device, the application, through the interface 206, may provide the user with instructions for improving the likelihood of the application to establish a secure communications session with the point-of-sale device. For instance, as illustrated in FIG. 2B, the application may instruct the user to hold the user device 202 next to the point-of-sale device until the secure communications session is established. This may allow the application to better detect and process any audial tones broadcast by the point-of-sale device.

Figures 3A, 3B:
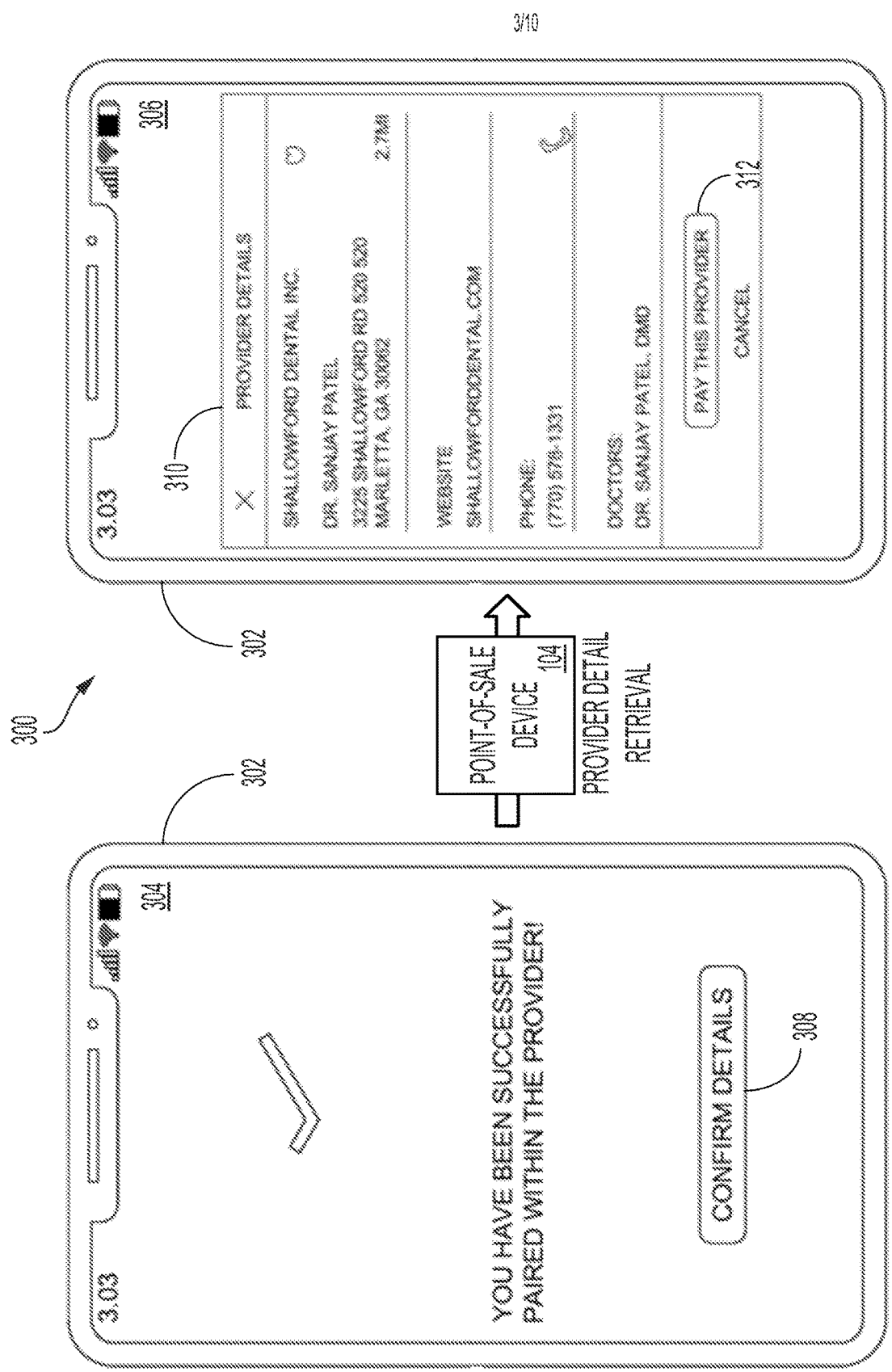
Figure 3C:
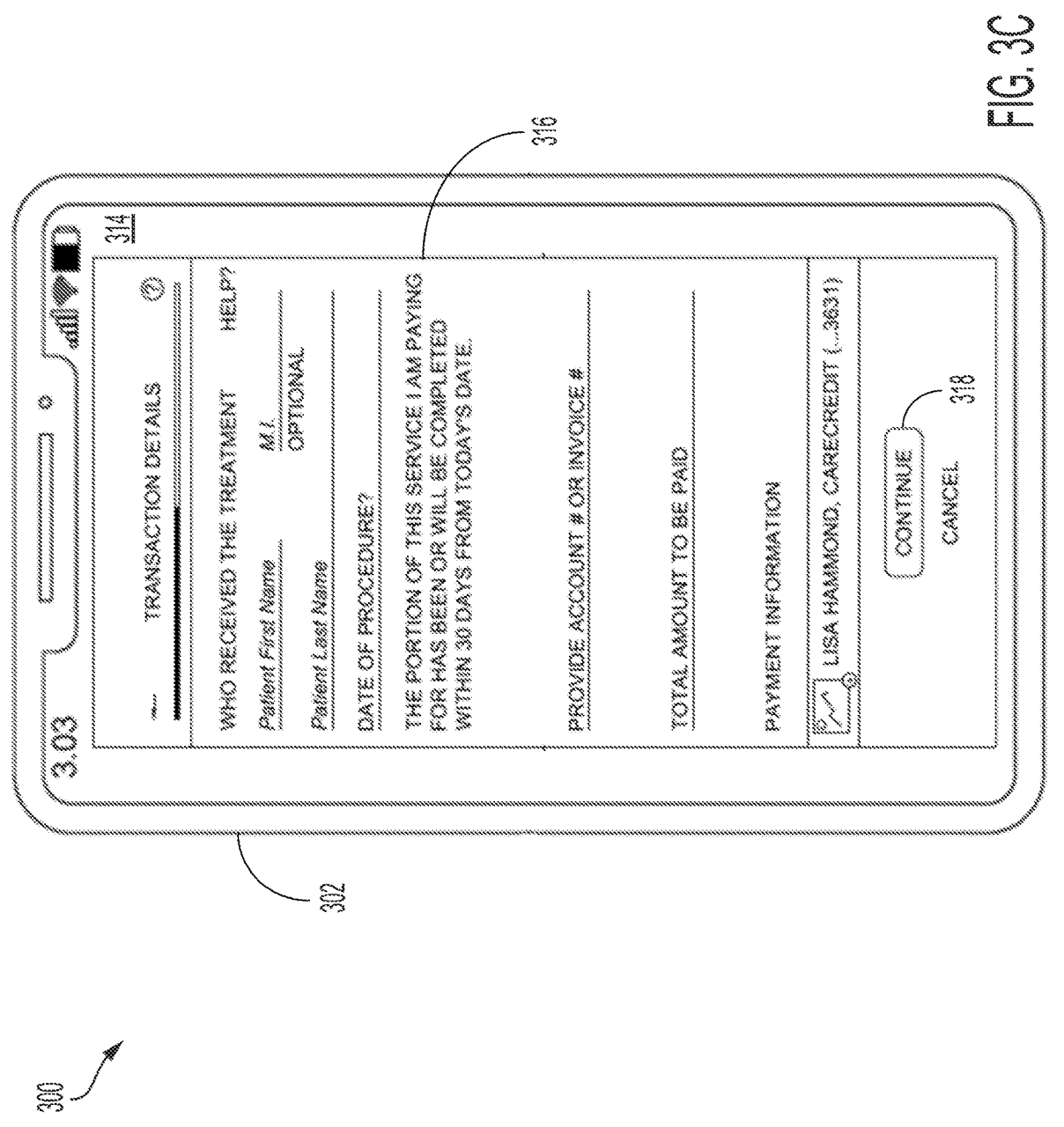

FIGS. 3A-3C show an illustrative example of an environment 300 in which an application executed on a user device 302 obtains identifying information associated with another entity from a point-of-sale device 104 that is used to initiate a payment transaction for submission of a payment to the other entity in accordance with at least one embodiment. In the environment 300, the application executed on a user device 302 has successfully established a secure communications session with the point-of-sale device 104. As noted above, the application may generate an audial tone that may be broadcast to the point-of-sale device in order to establish a connection with the point-of-sale device 104. The audial tone generated by the application may encode information that uniquely identifies the user device 302, which may be processed by the point-of-sale device 104 to identify the user device 302 and to generate, in response, another audial tone that may be broadcast to the user device 302. The audial tones generated by the application and the point-of-sale device 104 may encode authentication information that may be used to establish the secure communications session between the user device 302 and the point-of-sale device 104. Once the secure communications session has been successfully established, the application may display, via interface 304 on the user device 302 (as illustrated in FIG. 3A), an indication that the secure communications session has been established.

In an embodiment, once the secure communications session with the point-of-sale device 104 has been established, the application can process the audial tone generated by the point-of-sale device 104 to obtain identifying information associated with the other entity and payment information for the payment transaction. For instance, the point-of-sale device 104 may continuously transmit an audial tone that encodes information corresponding to the point-of-sale device 104 and the other entity. This information, for instance, may include the name of the other entity, the address of the other entity, contact information of the other entity, description of goods and/or services provided by the other entity, any identifying information of the point-of-sale device 104 (e.g., serial number, version number, etc.), and the like. In some examples, the point-of-sale device 104 can transmit an audial tone that encodes payment information to the user device 302 that may be used to determine a payment that is to be provided to the other entity. The payment information may include an invoice, bill, or other information indicating an amount owed to the other entity by the user. Further, the payment information may include additional details regarding the transaction, such as any goods and/or services rendered, identifying information about the other entity, insurance information associated with the user, and the like. This audial tone may be obtained and demodulated by the user device 302 via the application executed on the user device 302. For instance, in response to detecting and receiving an audial tone from the point-of-sale device 104, the application may utilize the SDK provided by the tone creation system to demodulate the audial tone and decode the payment information provided by the point-of-sale device 104 for the payment transaction.

Once the application has obtained the identifying information associated with the other entity and payment information from the audial tone broadcast by the point-of-sale device 104, the application may update the interface 304 to present a detail confirmation button 308 that may be used to access and review the obtained identifying information associated with the other entity and payment information via the user device 302. For example, through selection of the detail confirmation button 308, as illustrated in FIG. 3A, the user may submit a request to the application to present the obtained identifying information associated with the other entity and payment information. Alternatively, in an embodiment, selection of the detail confirmation button 308 can cause the application to transmit, over the secure communications session established with the point-of-sale device 104, a request to obtain the identifying information associated with the other entity and payment information. For example, if the user selects the detail confirmation button 308, the application may transmit, via the user device 302, an audial tone to the point-of-sale device 104 that encodes the request. The point-of-sale device 104 may present the request to the other entity, which may supply the requested information to the point-of-sale device 104 for delivery to the user device 302. The point-of-sale device 104 may encode the requested information into an audial tone that is broadcast to the user device 302, where it may be processed by the application using the SDK supplied by the tone creation system, as described above.

In response to the user selection of the detail confirmation button 308, the application may update the display of the user device 302 to present, as illustrated in FIG. 3B, interface 306. Through the interface 306, the application may provide the obtained identifying information associated with the other entity. For example, as illustrated in FIG. 3B, the application may present the obtained identifying information associated with the other entity through an entity detail window 310. The entity detail window 310 may include relevant information that may be used to verify the other entity to whom payment is to be provided. For example, the information provided through the entity detail window 310 may include the name and address of the other entity, contact information of the other entity, the name(s) of any providers or alternative entities associated with the other entity that may have assisted the user or otherwise rendered services to the user, and the like.

The application may further provide, via the entity detail window 310, a payment submission button 312, which the user may select to confirm that payment is to be provided to the other entity or any alternative entities specified in the entity detail window 310. Additionally, the application may provide an option to the user to cancel the payment transaction through the user device 302. For example, if the user is uncertain with regard to the provided identifying information associated with the other entity displayed via the interface 306, the user may select an option to cancel the payment transaction. This may cause the application to terminate the secure communications session with the point-of-sale device 104. Further, selection of the option to cancel the payment transaction may cause the application to present, via the display of the user device 302, an indication that the user has canceled the payment transaction and that an alternative payment method is to be used to provide payment to the other entity. In some instances, if the user opts to cancel the payment transaction, the application may transmit an audial signal to the point-of-sale device 104 to indicate that the payment transaction has been cancelled by the user. This audial signal may be transmitted prior to termination of the secure communications session. In response to this audial signal, the point-of-sale device 104 may indicate, to the other entity, that the payment transaction has been canceled by the user (e.g., through a display element of the point-of-sale device 104, through an audial signal, etc.). This may prompt the other entity to request an alternative payment method for the payment transaction.

If the user selects the payment submission button 312, the application may update the display of the user device 302 to present, as illustrated in FIG. 3C, interface 314. Through the interface 314, the application may provide a payment transaction detail window 316, through which the application may present details regarding the goods and/or services rendered to the user, the amount that is to be paid to the other entity, and the payment method that is to be used for the payment amount. For example, as illustrated in FIG. 3C, the provided details may include an indication of the person receiving treatment (e.g., services rendered by the other entity), the date of the procedure (e.g., date in which the services were rendered), a short description of terms of payment, account and/or invoice information (e.g., alphanumeric values corresponding to a user's account and/or to the invoice prepared by the other entity, etc.), an amount to be paid to the other entity as indicated, and the selected payment method for the transaction (e.g., "CareCredit" account or other line of credit, etc.).

In some instances, the application may prompt the user to provide additional information for the transaction. For example, the application may prompt the user to provide a payment amount and to select the one or more payment methods that are to be used to pay the indicated payment amount. Additionally, or alternatively, the application may prompt the user to provide a description of the goods and/or services provided by the other entity that may be used to indicate the purpose of the payment being made to the other entity. In some instances, the application may provide, via the interface 314, one or more options for different payment methods that may be used for the payment transaction. For example, in an embodiment, the application can request, from the payment processor system, information corresponding to different payment methods specified in the user's account. These different payment methods may include lines of credit (with the financial institution that implemented the payment processor system and/or with other financial institutions), banking accounts (e.g., checking, savings, etc.), retirement accounts, digital wallets (e.g., cryptocurrencies), rewards or loyalty program accounts, and the like. In some instances, the application may store information corresponding to payment methods previously utilized by the user for other payment transactions such that the application may use this information to present these payment methods to the user.

The application may further provide, via the payment transaction detail window 316, a continue button 318, which the user may select to initiate processing of the payment transaction. If the user selects the continue button 318, the application may transmit the provided identifying information associated with the other entity and payment information to the payment processor system to process the payment transaction and provide payment to the other entity indicated in the provided information. The application may provide the user, via the interface 314, with a confirmation or other indication that the payment transaction is being processed by the payment processor system according to the parameters defined or confirmed by the user via the interfaces 306, 314 illustrated in FIGS. 3B-3C. The processing of the payment transaction is described in greater detail in connection with FIG. 4.

In addition to providing the continue button 318 through the payment transaction detail window 316, the application may provide an option to cancel the payment transaction.

Similar to the option to cancel presented via the interface 306, selection of the option to cancel presented via the interface 314 may cause the application to terminate the secure communications session with the point-of-sale device 104. Further, selection of the option to cancel the payment transaction may cause the application to present, via the display of the user device 302, an indication that the user has canceled the payment transaction and that an alternative payment method is to be used to provide payment to the other entity. The application may further transmit an audial signal to the point-of-sale device 104 to indicate that the payment transaction has been cancelled by the user, as described above.

Figure 4:
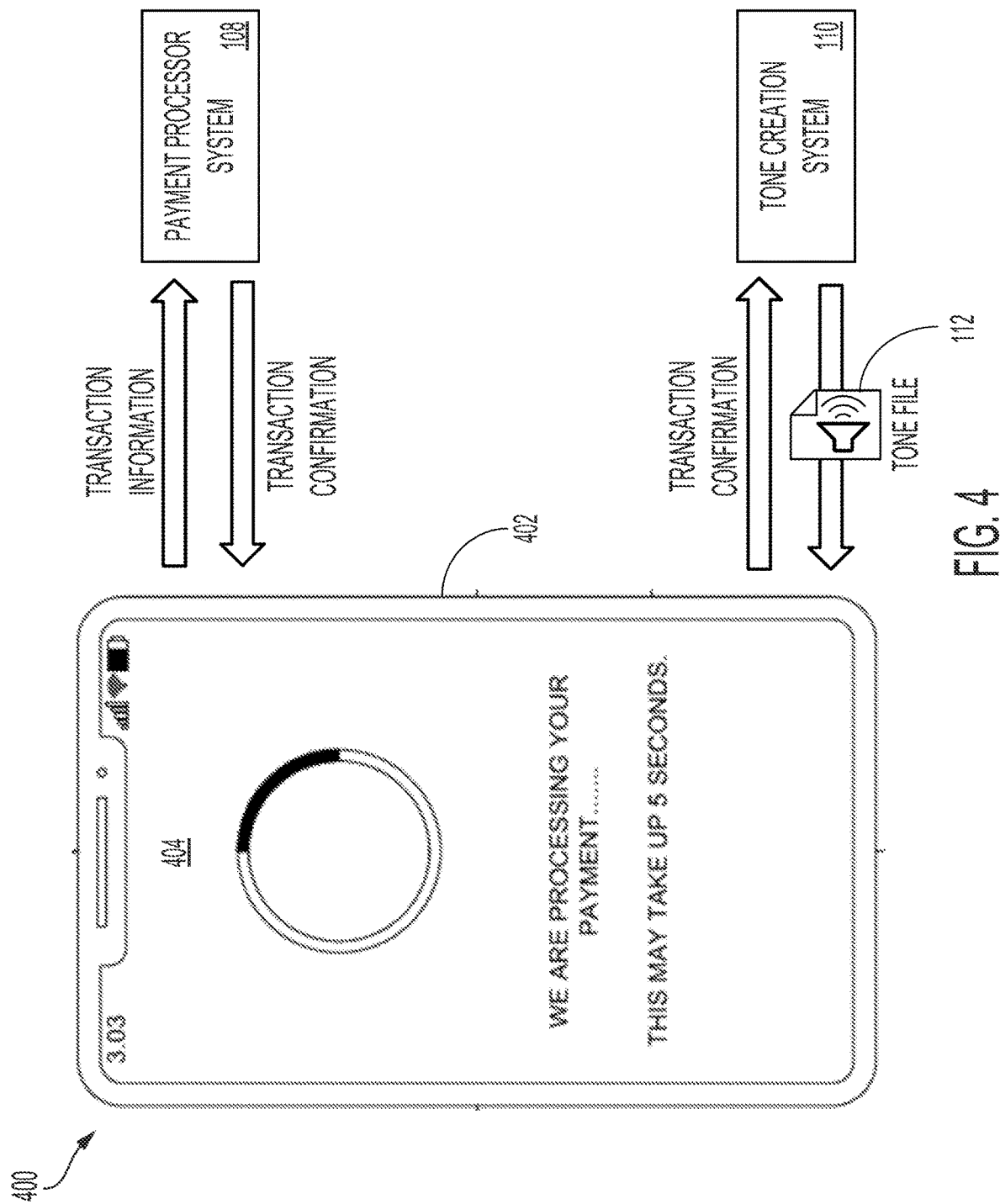
FIG. 4 shows an illustrative example of an environment in which an application executed on a user device completes a payment transaction with a payment processor system for payment to another entity and communicates with a tone creation system to obtain a tone file corresponding to a payment transaction confirmation in accordance with at least one embodiment.

FIG. 4 shows an illustrative example of an environment 400 in which an application executed on a user device 402 completes a payment transaction with a payment processor system 108 for payment to another entity and communicates with a tone creation system 110 to obtain a tone file 112 corresponding to a payment transaction confirmation in accordance with at least one embodiment. In the environment 400, the application executed on the user device 402 may indicate, via an interface 404 of the application, that the payment transaction with the merchant is being processed by the payment processor system 108. The interface 404 may be presented to the user in response to a user request to initiate processing of the payment transaction, as described above in connection with FIGS. 3A-3C. In response to this user request, the application may transmit to the payment processor system 108, the identifying information associated with the other entity and payment information provided by the point-of-sale device, scanned from a QR code or other scannable object at the point-of-sale, or manually entered by the user via the application.

In an embodiment, the application provides, in addition to the obtained identifying information associated with the other entity and payment information for the transaction, authentication information that can be used by the payment processor system 108 to authenticate the application and the user of the user device 102. For example, prior to transmitting the identifying information associated with the other entity and payment information to the payment processor system 108, the application may prompt the user to provide credential information associated with the user's account maintained by the financial institution that implements the payment processor system 108. As noted above, this credential information may include a username, a password, a one-time password, biometric information, cryptographic key(s), and the like. In response to obtaining this credential information from the application, the payment processor system 108 may process the credential information to determine whether the application and/or the user (as required) may be authenticated. If the application and/or user cannot be authenticated, the provided identifying information associated with the other entity and payment information may be automatically rejected by the payment processor system 108. In some instances, the payment processor system 108 may transmit an indication to the user device 102 that the application and/or user could not be authenticated if the provided credential information is not valid. Accordingly, the user may be prompted to provide valid credential information for the payment transaction. This process may continue for a limited number of times, whereby if the application and/or user cannot be authenticated by the payment processor system 108, the payment transaction may be rejected. Further, in some instances, the payment processor system 108 may prompt the user to utilize an alternative method of payment for the payment transaction at the point-of-sale (e.g., cash, check, physical swipe of credit card, etc.).

In an embodiment, the user may be prompted to provide their credential information to the payment processor system 108 prior to the submission of the identifying information associated with the other entity and payment information for the payment transaction. This may allow the payment processor system 108 to authenticate the user and obtain, from the user's account maintained by the financial institution that implements the payment processor system 108, any known or associated payment methods available to the user. As noted above, the user's account may be associated with the user may indicate one or more payment methods that may be used for payments to other entities. These one or more payment methods may include lines of credit (e.g., credit card accounts, etc.), checking/savings accounts (through one or more financial institutions), loyalty or rewards program points, digital wallets associated with one or more cryptocurrencies, and the like. The payment processor system 108 may present these available payment methods to the user via the interface 314 described above in connection with FIG. 3C. Further, through the interface 314, the user may manually provide an alternative payment method than those identified by the payment processor system 108. Additionally, or alternatively, the user may indicate that they would like to utilize any combination of their available payment methods and any other payment methods indicated by the user for the payment that is to be submitted to the other entity. For instance, the user may define, through the interface 314 described above in connection with FIG. 3C, that it would like to pay for a portion of the transaction using a line of credit and the remaining portion using their designated checking account.

In an embodiment, if the application and/or user (as required by the payment processor system 108) are successfully authenticated, and the application has provided the requisite identifying information associated with the other entity and payment information for the payment transaction, the payment processor system 108 can obtain the required payment from the indicated payment sources (e.g., as specified through the selected payment method(s), etc.) that is to be used to pay the other entity for the present transaction. For instance, if the user selects one or more payment methods associated with the financial institution that implements the payment processor system 108, the payment processor system 108 may access the user accounts corresponding to these one or more payment methods to obtain the required payment. Additionally, or alternatively, if the user has indicated that one or more accounts not associated with the financial institution that implements the payment processor system 108 are to be used for payment, the payment processor system 108 may access any other financial institution(s) associated with these one or more accounts in order to obtain the necessary payment for the transaction. For example, if the user has selected a checking or savings account associated with another financial institution for payment, the payment processor system 108 may obtain this payment electronically from this other financial institution, such as through EFT, ACH, and the like.

Once the payment processor system 108 has obtained the requested payment from the indicated one or more payment sources, the payment processor system 108 can transfer the payment to an account associated with the other entity or otherwise make the payment available to the other entity through any method as indicated by the other entity (e.g., transfer to a banking account associated with the other entity, delivery of a physical check or other payment instrument, conversion to a cryptocurrency and transfer to the other entity's digital wallet, etc.). Further, the payment processor system 108 may generate a payment confirmation indicating that the payment to the other entity has been successfully processed. The payment confirmation may indicate the recipient of the payment (e.g., the other entity, an account associated with the other entity, a third-party associated with the other entity, etc.), the payment amount, a unique confirmation identifier (e.g., an alphanumeric string, a cryptographic hash, etc.), and the like. Further, the payment confirmation may include identifying information of the payment processor system 108 and/or of the financial institution that implements the payment processor system 108. This identifying information may include a unique identifier (e.g., an alphanumeric string, a cryptographic hash, etc.) corresponding to the payment processor system 108 and/or to the financial institution that implements the payment processor system 108.

As noted above, in order to provide the payment confirmation to the point-of-sale device associated with the other entity, the payment confirmation may need to be encoded in an audial tone that may be received and processed by the point-of-sale device. In order for this audial tone to be accepted by the point-of-sale device, the audial tone may need to have a particular set of expected characteristics (e.g., frequency, pitch, amplitude, pattern, etc.). For instance, as noted above, the point-of-sale device may implement an algorithmic library that may be used to authenticate audial tones based on the expected characteristics of these audial tones. This algorithmic library may implement a time-based algorithm that may automatically generate expected audial signal characteristics based on the current time. The time-based algorithm may also be maintained by the payment processor system 108 and the tone creation system 110 in order to generate an audial tone that has the correct set of characteristics that may be used to authenticate the audial tone. Alternatively, the algorithmic library may implement an algorithm that limits the number of times an audial tone having a particular set of characteristics may be processed by the point-of-sale device.

To generate the appropriate characteristics for the audial tone that is to be broadcast to the point-of-sale device to provide the payment confirmation, the payment processor system 108 may use identifying information corresponding to the point-of-sale device associated with the other entity to determine the algorithmic library implemented on the point-of-sale device. Based on this determination, the payment processor system 108 may calculate what characteristics of an audial tone are to be expected in order for the point-of-sale device to authenticate the audial tone for receiving a payment confirmation from the user device 402. These characteristics may be provided with the payment confirmation to the user device 402, which the application may provide to the tone creation system 110 for the creation of an audial tone that encodes the payment confirmation and that has the identified characteristics.

In response to receiving the payment confirmation and the audial tone characteristics for delivery of the payment confirmation from the payment processor system 108, the application executed on the user device 402 may transmit an API call to the tone creation system 110 to generate a tone file 112 that may be used to produce an audial tone that encodes the payment confirmation and that has the required characteristics to ensure acceptance of the delivery confirmation by the point-of-sale device. The API call may include the payment confirmation provided by the payment processor system 108, identifying information corresponding to the user device 402 and/or the user (e.g., device serial number, application serial number, user contact information, etc.), as well as the characteristics defined by the payment processor system 108 for the audial tone that is to be generated for the point-of-sale device.

The tone creation system 110, in response to receiving the API call from the application executed on the user device 402, may generate a tone file 112 that may be processed by the application executed on the user device 402 to generate the audial tone that is to be broadcast to the point-of-sale device. As noted above, the tone file 112 may include executable instructions that, when executed by the application using the SDK provided by the tone creation system 110, may cause the user device 402 to generate an audial tone that encodes the payment confirmation and the identifying information corresponding to the user device 402 and/or the user. Further, the audial tone may be generated to have the characteristics defined by the payment processor system 108 such that the audial tone may be accepted and authenticated by the point-of-sale device. The tone creation system 110 may transmit the tone file 112 to the user device 402, which may process the tone file 112 using the SDK provided by the tone creation system 110.

In an embodiment, rather than providing the identified characteristics for the audial tone and the payment confirmation to the user device 402, the payment processor system 108 can provide the identified characteristics and the payment confirmation to the tone creation system 110 directly. For instance, the payment processor system 108 may transmit an API call to the tone creation system 110 that includes the payment confirmation, the identified characteristics for the audial tone, and contact information associated with the user device 402. In response to receiving the API call, the tone creation system 110 may automatically prompt the user, through their user device 402, to provide identifying information corresponding to the user device 402 and/or the user that may be encoded in the audial tone. If the user provides the requisite identifying information, the tone creation system 110 may generate and transmit the tone file 112 to the user device 402 as described above. In some instances, the payment processor system 108 may provide this identifying information through the API call to the tone creation system 110. For instance, when providing the transaction information to the payment processor system 108, the user, through their user device 402, may further transmit the identifying information corresponding to the user device 402 and/or the user to the payment processor system 108. As another illustrative example, the payment processor system 108 may maintain, in a database or other datastore, this identifying information corresponding to the user device 402 and/or the user. For instance, if the user maintains one or more accounts with the payment processor system 108, the payment processor system 108 may automatically access these one or more accounts to retrieve the identifying information associated with the user device 402 and/or the user. Thus, in some instances, the tone creation system 110 may automatically obtain the identifying information corresponding to the user device 402 and/or the user and generate the tone file 112 without user intervention.

Figure 5:
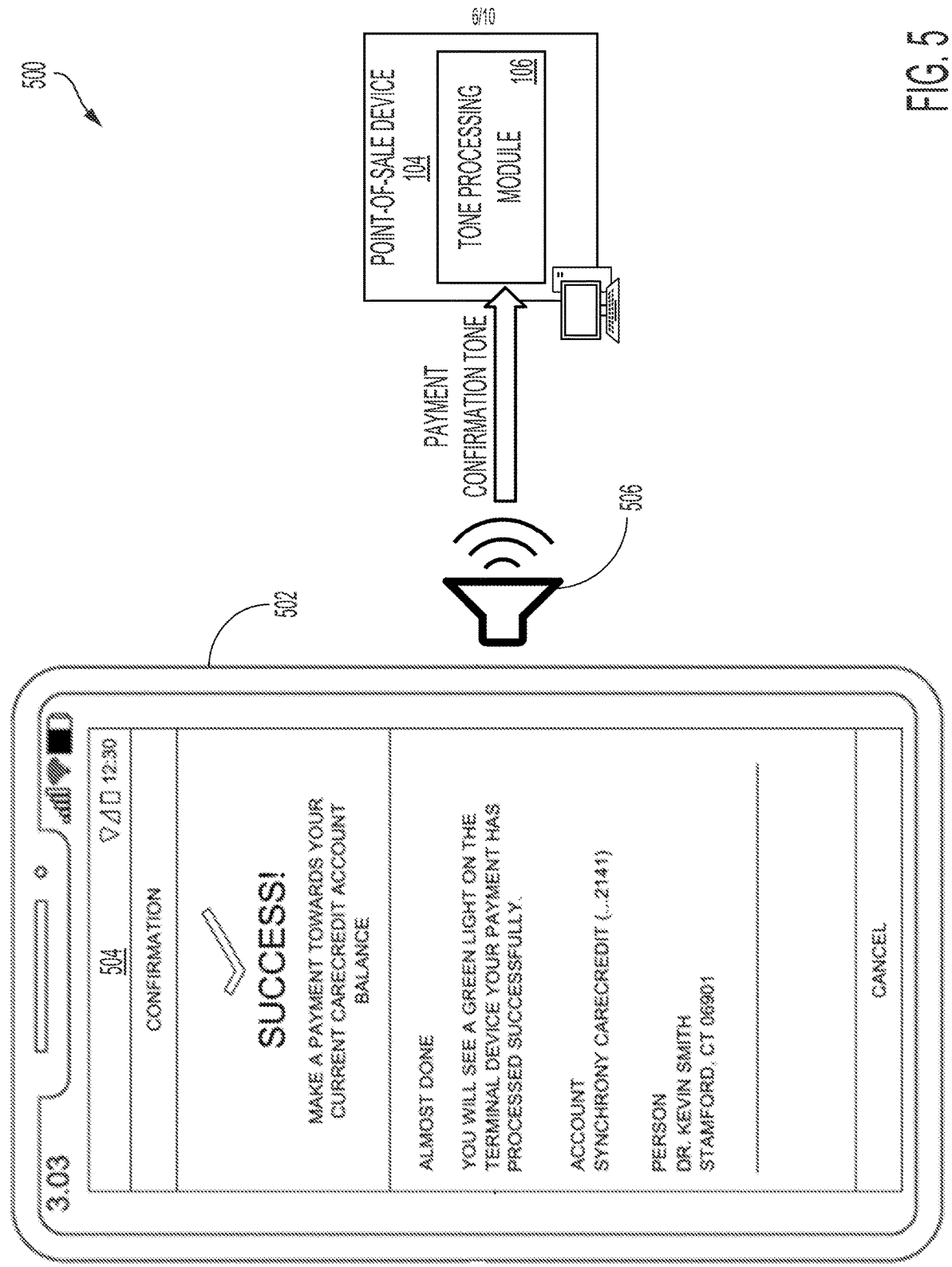
FIG. 5 shows an illustrative example of an environment in which an application executed on a user device causes the user device to broadcast a tone that includes a payment transaction confirmation for payment to another entity in accordance with at least one embodiment.

FIG. 5 shows an illustrative example of an environment 500 in which an application executed on a user device 502 causes the user device 502 to broadcast an audial tone 506 that includes a payment transaction confirmation for payment to another entity in accordance with at least one embodiment. In the environment 500, the application executed on the user device 502 processes the tone file using an SDK provided by the tone creation system (e.g., tone creation system 110 described above in connection with FIG. 1) to generate, using the user device 502, an audial tone 506 that encodes the payment confirmation provided by the payment processor system and other information that may be used to authenticate the audial tone 506 (e.g., identifying information corresponding to the user device 502 and/or user, etc.). The audial tone 506 may be broadcast to the point-of-sale device 104 using one or more speakers of the user device 502.

In an embodiment, the application implemented on the user device 502 can determine whether the user device 502 is within audible range of the point-of-sale device 104. For instance, as noted above, if the point-of-sale device 104 continuously emits an audial tone to denote its presence and to broadcast identifying information associated with another entity that implements the point-of-sale device 104, the application, using a microphone on the user device 502, may determine whether it detects this audial tone from the point-of-sale device 104. If so, the application may determine that the point-of-sale device 104 is within audible range of the user device 502 and can receive the audial tone 506. As another illustrative example, the application may utilize Global Positioning System (GPS) or other location services implemented on the user device 502 to determine the location of the user device 502 in relation to the location of the point-of-sale device 104 (e.g., a geographic location corresponding to the other entity that implements the point-of-sale device 104, etc.). If the user device 502 is located within spatial proximity of the location of the point-of-sale device 104, the application may begin broadcasting the audial tone 506. In some instances, the application may broadcast a ping or other test audial tone that may be used to determine whether the point-of-sale device 104 is within audible range of the user device 502. For instance, the ping or other test audial tone, when received by the point-of-sale device 104, may cause the point-of-sale device 104 to broadcast a response tone that may be processed by the application to determine that the point-of-sale device 104 is within audible range of the user device 502.

If the user device 502 is not within the audible range of the point-of-sale device 104, the application may instruct the user to move the user device 502 closer to the point-of-sale device 104 in order to place the user device 502 within the audible range of the point-of-sale device 104. Once the application detects that the user device 502 is within audible range of the point-of-sale device 104, the application may utilize the received tone file and the SDK provided by the tone creation system to generate and broadcast the audial tone 506. As noted above, this audial tone 506 may have the characteristics defined by the payment processor system such that the audial tone 506 may be authenticated by the point-of-sale device 104. Further, as noted above, the audial tone 506 may encode the payment confirmation and any other information that may be used to authenticate the audial tone 506 (e.g., identifying information corresponding to the user device 502 and/or user, etc.).

In an embodiment, the application, in response to receiving the payment confirmation from the payment processor system and the tone file from the tone creation system, can update the display of the user device 502 to present, as illustrated in FIG. 5, interface 504. Through the interface 504, the application may display the received payment confirmation to the user. This payment confirmation may indicate the one or more payment methods used for the payment transaction, as well as information corresponding to the other entity or other recipient of the payment (e.g., name, address, contact information, etc.), the payment amount, and the like. Additionally, through the interface 504, the application may instruct the user with regard to determining whether the payment confirmation has been received by the point-of-sale device 104. For example, as illustrated in FIG. 5, the application may indicate that the user will see a green light on the point-of-sale device 104 if the submitted payment has been processed successfully (e.g., the point-of-sale device 104 has obtained and successfully processed the payment confirmation from the audial tone 506).

In some instances, the application, through the interface 504, may provide the user with an option to cancel the payment transaction. If the user opts to cancel the payment transaction, the application may forego broadcasting the audial tone 506 and instead may transmit a notification to the payment processor system to indicate that the user has requested cancellation of the payment transaction. In response to this request, the payment processor system may reverse the payment transaction and indicate that the payment transaction has been cancelled. Further, the application may update the interface 504 to instruct the user to utilize an alternative payment method for the transaction with the other entity. This may include presenting a payment instrument to the other entity at the point-of-sale for manual entry, using a fiat currency, or arranging an alternative method of payment (e.g., payment installments, a loan, etc.).

As noted above, the audial tone 506 broadcast by the application through the user device 502 may be detected by the point-of-sale device 104 using a tone processing module 106. The tone processing module 106 may implement the SDK provided by the tone creation system in order to receive, authenticate, and demodulate audial tones received by the point-of-sale device 104. Additionally, the tone processing module 106 may implement an algorithmic library that may be used to authenticate audial tones based on the expected characteristics of these audial tones. As noted above, the algorithmic library may implement a time-based algorithm that may automatically generate expected audial signal characteristics based on the current time. This time-based algorithm may also be maintained and synchronized between the payment processor system and the tone creation system in order to allow for the creation of an audial tone 506 that has the correct set of characteristics for authentication of the audial tone 506. Alternatively, the algorithmic library may implement an algorithm that limits the number of times an audial tone having a particular set of characteristics may be processed by the point-of-sale device 104. For instance, if an audial tone is received with a particular set of characteristics, the tone processing module 106 may automatically reject any subsequent audial tones having this particular set of characteristics permanently or for a particular period of time (e.g., a day, a week, etc.). Thus, the tone processing module 106 may automatically reject any audial tone that does not have the expected characteristics, as determined using the algorithmic library.

In response to receiving the audial tone 506 from the user device 502, the tone processing module 106 may evaluate the audial tone 506 to determine its authenticity and to otherwise determine whether the audial tone 506 may be processed. For instance, using the aforementioned algorithmic library, the tone processing module 106 may determine whether the received audial tone 506 has the expected set of characteristics. If the tone processing module 106 determines that the received audial tone 506 does not have the expected set of characteristics, the tone processing module 106 may automatically reject the audial tone 506. In some instances, if the audial tone 506 is rejected, the tone processing module 106 may cause the point-of-sale device 104 to provide an indication of this rejection, as noted above.

If the audial tone 506 is rejected by the tone processing module 106, the application may transmit a notification to the payment processor system to indicate that payment confirmation could not be provided to the other entity via the point-of-sale device 104. Accordingly, the payment processor system may utilize one or more other methods to communicate the payment confirmation to the other entity. For instance, the financial institution that implements the payment processor system may contact the other entity (e.g., e-mail, telephone, etc.) to indicate that a payment has been received for the transaction and that the payment has been transferred to the other entity's designated entity (e.g., bank account, third-party entity, etc.). In some instances, the payment processor system may reverse the payment made to the other entity and instruct the user, via the application executed on the user device 502, to utilize an alternative payment method for the transaction with the other entity.

In an embodiment, if the audial tone 506 is accepted by the tone processing module 106, the tone processing module 106 uses the SDK provided by the tone creation system to demodulate the audial tone 506 and obtain the payment confirmation encoded therein. Further, the tone processing module 106 may automatically evaluate the payment confirmation and any authentication information provided therein to further determine the authenticity of the audial tone 506. If the tone processing module 106 is unable to authenticate the payment confirmation provided in the audial tone 506, the tone processing module 106 may reject the audial tone 506 using the methods described above.

If the payment confirmation is successfully authenticated, the tone processing module 106 may cause the point-of-sale device 104 to provide an indication that the payment confirmation has been received and accepted. For instance, the tone processing module 106 may cause the point-of-sale device 104 to activate an LED on the point-of-sale device that serves as an indication of the receipt and acceptance of the payment confirmation. For example, the tone processing module 106 may cause the point-of-sale device 104 to activate a green light or other green indication (as indicated in the interface 504) that may be viewed by the user of the user device 502 to indicate that the payment confirmation was received and processed successfully by the point-of-sale device 104. In some instances, the point-of-sale device 104 may also provide the payment confirmation to the other entity, such as through one or more display elements on the point-of-sale device 104 (e.g., LCD screen or monitor, etc.).

Figure 6:
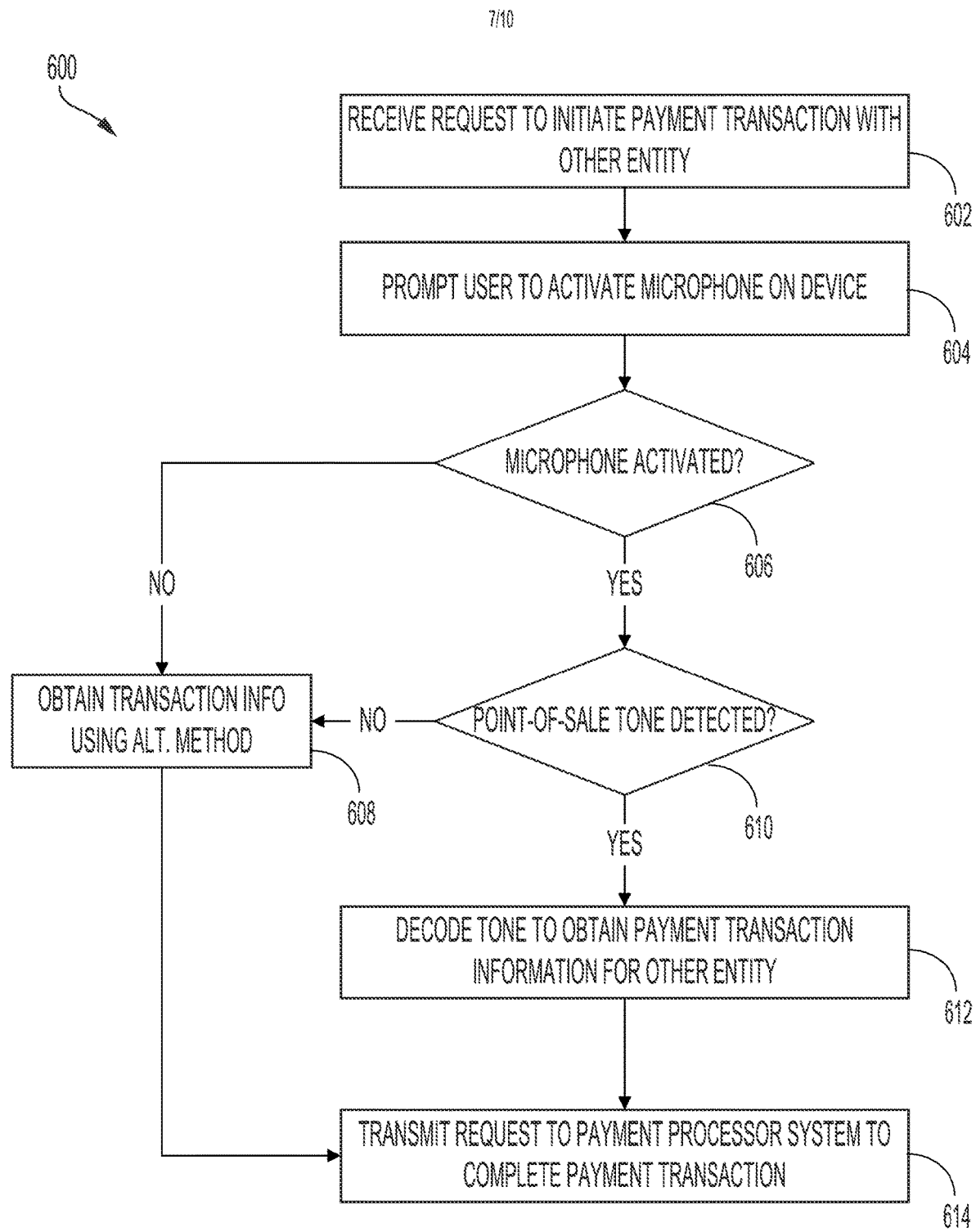
FIG. 6 shows an illustrative example of a process for obtaining payment transaction information from another entity in order to submit a request to a payment processor system to complete a payment transaction for payment to the other entity in accordance with at least one embodiment.

FIG. 6 shows an illustrative example of a process 600 for obtaining payment transaction information from another entity in order to submit a request to a payment processor system to complete a payment transaction for payment to the other entity in accordance with at least one embodiment. The process 600 may be performed by the aforementioned application executed on a user device utilized by a user at a point-of-sale to provide payment to another entity for goods and/or services rendered by the other entity. As noted above, the application may be provided by the payment processor system or other entity that implements the payment processor system, such as a financial institution through which the user may maintain a financial account. The user may download the application from the payment processor system in order to enable reverse terminal payments to other entities that may also be associated with the payment processor system to obtain payments submitted by participating users.

At step 602, the application may receive request to initiate a payment transaction with another entity. As noted above, a user at a point-of-sale (e.g., store, office, kiosk, etc.) may be prompted to execute the application in order to initiate a payment transaction with another entity at the point-of-sale. For instance, another entity at the point-of-sale may indicate that the user may utilize the application to provide payment for goods sold and/or services rendered to the user. If the other entity implements a point-of-sale device provided by the payment processor in order to provide a method for conducting payment transactions through a user's device, the other entity may provide instructions to execute the application in order to communicate with the point-of-sale device (e.g., written instructions, spoken instructions, etc.). In some instances, the user, through the user device, may scan a QR code, bar code, and/or other scannable objects at the point-of-sale that may cause the user device to automatically execute the application and generate a request to initiate a payment transaction with the other entity.

At step 604, the application may prompt the user to activate a microphone implemented on the user device in order to capture any audial tones broadcast by the point-of-sale device that may include identifying information associated with the other entity and payment information for the payment transaction. For instance, as illustrated in FIG. 2A, the application may provide the user with a set of instructions for activating the microphone implemented on the user device. Additionally, or alternatively, the application may provide a user interface (UI) element, such as a microphone activation button, that the user may select to activate the microphone implemented on the user device. It should be noted that, in some instances, the process 600 may be performed without prompting the user to activate the microphone implemented on the user device. For example, in response to the request to initiate a payment transaction with another entity, the application may automatically activate the microphone implemented on the user device to capture any identifying information associated with the other entity and payment information for the payment transaction without any user intervention.

At step 606, the application may determine whether the microphone implemented on the user device has been activated in order to detect audial tones from the point-of-sale device. For instance, if the user has selected a UI element provided by the application for activation of the microphone implemented on the user device, the application may attempt to activate the microphone by transmitting a request to the operating system of the user device to activate the microphone and obtain and data obtained through the microphone. If the user has not granted the application permission to access the microphone, the request may be automatically denied. In some instances, the application may determine whether the user has granted the application permission to access the microphone implemented on the user device such that, if permission has not been granted, the application may prompt the user to provide the application with access to the microphone in order to capture any audial tones broadcast by the point-of-sale device. In some instances, if the application can also detect if the user has selected an alternative UI element corresponding to an alternative option for collecting identifying information associated with the other entity for the payment transaction. As noted above, these alternative UI elements may include a button that, when selected, may cause the application to activate a camera or other scanning element of the user device to scan a QR code or other element that may encode the required identifying information associated with the other entity. Further, these alternative UI elements may include a button that, when selected, may allow the user to manually enter the required identifying information associated with the other entity and any other information that may be required for the payment transaction. Selection of any of these alternative UI elements may denote a user indication that they do not wish to activate the microphone on the user device. It should be noted that, in some instances, the application may automatically attempt to activate the microphone without requiring additional user input. For instance, in response to receiving the request to initiate a payment transaction with another entity, the application may automatically attempt to activate the microphone implemented on the user device. The user's request to initiate the payment transaction may serve as requisite authorization for attempting to activate the microphone implemented on the user device.

If the application determines that the microphone implemented on the user device is not activated (e.g., insufficient permissions granted to the application, user selection of an alternative UI element, application is unable to activate the microphone, etc.), the application, at step 608, may obtain the payment transaction information using one or more alternative methods. For instance, if the user has opted to use the camera or other element of the user device to scan a QR code or other element that may encode the required identifying information associated with the other entity, the application may obtain a portion of the payment transaction information (e.g., identifying information associated with the other entity, a third-party entity that is to receive payment, etc.) from the QR code or other element. In some instances, scanning of the QR code or other element may cause the application to access a website through which the payment transaction information may be obtained. As another example, if the user has opted to manually provide the payment transaction information, the application may update the interface presented via the user device to provide input fields through which the user can manually enter the required payment transaction information (e.g., identifying information associated with the other entity, a third-party entity that is to receive payment, selected payment method (s), payment amount, etc.).

In an embodiment, if the microphone implemented on the user device has been activated, the application can determine, at step 610, whether an audial tone from the point-of-sale has been detected. For instance, once the microphone has been activated, the application may generate an audial tone that may be broadcast to the point-of-sale device in order to establish a connection with the point-of-sale device. The audial tone generated by the application may encode information that uniquely identifies the user device, which may be processed by the point-of-sale device to identify the user device and to generate, in response, another audial tone that may be broadcast to the user device. The audial tones generated by the application and the point-of-sale device may encode authentication information that may be used to establish a secure communications session between the user device and the point-of-sale device. Alternatively, the point-of-sale device may continuously broadcast an audial tone that encodes identifying information associated with the other entity that may be used for the payment transaction. This information, for instance, may include the name of the other entity, the address of the other entity, contact information of the other entity, description of goods and/or services provided by the other entity, any identifying information of the point-of-sale device (e.g., serial number, version number, etc.), and the like. The application may use the microphone to detect and receive the audial tone broadcast by the point-of-sale device to obtain the information corresponding to the point-of-sale device and the other entity.

If the application is unable to detect an audial tone broadcast by the point-of-sale device, the application may prompt the user to hold their user device within a particular proximity of the point-of-sale device in order to facilitate detection of the audial tone broadcast by the point-of-sale device using the microphone implemented on the user device. As noted above, the application can determine whether the user device is within the audible range of the point-of-sale device. For instance, as noted above, if the point-of-sale device continuously emits an audial tone to denote its presence and to broadcast identifying information associated with the other entity, the application, using a microphone on the user device, may determine whether it detects this audial tone from the point-of-sale device. If so, the application may determine that the point-of-sale device is within audible range of the user device and can receive the audial tone. As another illustrative example, the application may utilize the GPS or other location services implemented on the user device to determine the location of the user device in relation to the location of the point-of-sale device. If the user device is located within spatial proximity of the location of the point-of-sale device, the application may attempt to detect the audial tone from the point-of-sale device. In some instances, the application may broadcast a ping or other test audial tone that may be used to determine whether the point-of-sale device is within audible range of the user device. For instance, the ping or other test audial tone, when received by the point-of-sale device, may cause the point-of-sale device to broadcast a response tone that may be processed by the application to determine that the point-of-sale device is within audible range of the user device. If the application is unable to detect an audial tone from the point-of-sale regardless of these attempts to detect this audial tone, the application may, at step 608, obtain the payment transaction information using one or more alternative methods, as described above.

If the application detects an audial tone from the point-of-sale device, the application, at step 612, may decode the audial tone to obtain payment transaction information for the other entity. For instance, if the application is able to establish a secure communications session with the point-of-sale device, the point-of-sale device can transmit payment information to the user device that may be used to determine a payment that is to be provided to the other entity. The payment information may include an invoice, bill, or other information indicating an amount owed to the other entity by the user. Further, the payment information may include additional details regarding the transaction, such as any goods and/or services rendered, identifying information about the other entity, insurance information associated with the user, and the like. In response to detecting and receiving an audial tone from the point-of-sale device, the application may utilize the SDK provided by the tone creation system to demodulate the audial tone and decode the payment information provided by the point-of-sale device for the payment transaction. The application may present the payment information to the user via a display element of the user device to allow the user to review the payment information and verify the amount that is to be paid to the other entity in the transaction prior to sending a payment transaction request to the payment processor system.

At step 614, once the application has obtained the payment transaction information (through an audial tone from the point-of-sale device and/or through one or more alternative methods), the application may transmit a payment request to the payment processor system to complete the payment transaction. In some instances, the application may further provide authentication information that may be used by the payment processor system to authenticate the application and the user of the user device. For instance, the application may prompt the user to provide credential information that may be associated with a user account maintained by the payment processor. This credential information may include a username, a password, a one-time password, biometric information, cryptographic key(s), and the like. In some instances, the user may indicate that they would like to utilize any combination of their available payment methods for the payment that is to be submitted to the other entity. For instance, the user may define, through the application, that it would like to pay for a portion of the transaction using a line of credit and the remaining portion using their designated checking account. The application may provide information corresponding to the user's selection of available payment methods for the payment transaction.

Figure 7:
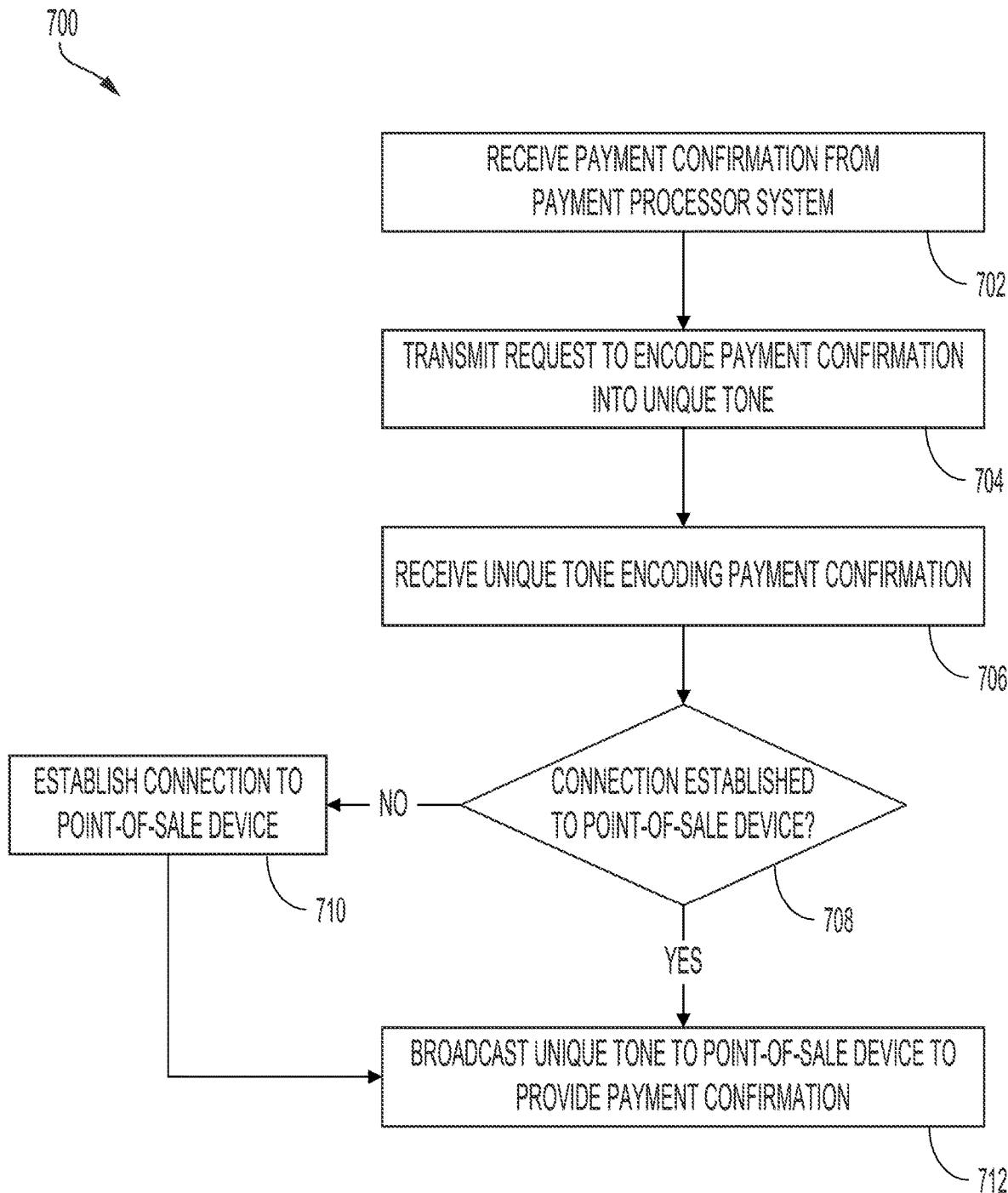
FIG. 7 shows an illustrative example of a process for obtaining and broadcasting a tone that encodes payment confirmation information to provide another entity with the payment confirmation information in accordance with at least one embodiment.

FIG. 7 shows an illustrative example of a process 700 for obtaining and broadcasting a tone that encodes payment confirmation information to provide another entity with the payment confirmation information in accordance with at least one embodiment. The process 700 may be performed by the aforementioned application executed on a user device utilized by a user at a point-of-sale to provide payment to another entity for goods and/or services rendered. The application, as noted above, may implement an SDK provided by a tone creation system to convert audial files from the tone creation system into an audial tone that may be broadcast using the speaker(s) of the user device to the point-of-sale device. Further, the SDK may be used by the application to demodulate any audial tones broadcast by the point-of-sale device to the user device.

At step 702, the application executed on the user device may receive a payment confirmation from the payment processor system. As noted above, once the payment processor system has obtained the requested payment from one or more payment sources indicated in the payment request submitted by the user via the application, the payment processor system can transfer the payment to an account associated with the other entity or otherwise make the payment available to the other entity through any method as indicated by the other entity. Further, the payment processor system may generate a payment confirmation indicating that the payment to the other entity has been successfully processed. The payment confirmation may indicate the recipient of the payment (e.g., the other entity, an account associated with the other entity, a third-party associated with the other entity, etc.), the payment amount, a unique confirmation identifier (e.g., an alphanumeric string, a cryptographic hash, etc.), and the like. Further, the payment confirmation may include identifying information of the payment processor system and/or of the financial institution that implements the payment processor system. This identifying information may include a unique identifier corresponding to the payment processor system and/or to the financial institution that implements the payment processor system. The payment processor system may transmit this payment confirmation to the application via a communications network, such as the Internet.

As noted above, in some instances, the audial tone that is to be generated by the application may need to have a set of characteristics that are recognized by the point-of-sale device as corresponding to a valid message. For instance, as noted above, the point-of-sale device may implement an algorithmic library that may be used to authenticate audial tones based on the expected characteristics of these audial tones. To generate the appropriate characteristics for the audial tone that is to be broadcast to the point-of-sale device to provide the payment confirmation, the payment processor system may use identifying information corresponding to the point-of-sale device associated with the merchant to determine the algorithmic library implemented on the point-of-sale device. Based on this determination, the payment processor system may calculate what characteristics of an audial tone are to be expected in order for the point-of-sale device to authenticate the audial tone for receiving a payment confirmation from the user device. These characteristics may be provided with the payment confirmation to the user device.

At step 704, the application may transmit a request to a tone creation system to encode the payment confirmation into a unique audial tone that may be processed by the point-of-sale device. For instance, in response to receiving the payment confirmation and the audial tone characteristics for delivery of the payment confirmation from the payment processor system, the application may transmit an API call to the tone creation system to generate a tone file that may be used to produce an audial tone that encodes the payment confirmation and that has the required characteristics to ensure acceptance of the payment confirmation by the point-of-sale device. The API call may include the payment confirmation provided by the payment processor system, identifying information corresponding to the user device and/or the user (e.g., device serial number, application serial number, user contact information, etc.), as well as the characteristics defined by the payment processor system for the audial tone that is to be generated for the point-of-sale device.

As noted above, the tone creation system, in response to receiving the API call from the application executed on the user device, may generate a tone file that may be processed by the application to generate the audial tone that is to be broadcast to the point-of-sale device. The tone file may include executable instructions that, when executed by the application using the SDK provided by the tone creation system, may cause the user device to generate an audial tone that encodes the payment confirmation and the identifying information corresponding to the user device and/or the user. Further, the audial tone may be generated to have the characteristics defined by the payment processor system such that the audial tone may be accepted and authenticated by the point-of-sale device. The tone creation system may transmit the tone file to the user device, which may process the tone file using the SDK provided by the tone creation system. Thus, at step 706, the application may receive the unique audial tone encoding the payment confirmation from the tone creation system.

It should be noted that, in some embodiments, the process 700 can be performed without transmitting a request to the tone creation system for obtaining a unique tone file that may be used to generate the unique audial tone that may be transmitted to the point-of-sale device. As noted above, the payment processor system may transmit an API call to the tone creation system that includes the payment confirmation, the identified characteristics for the audial tone, and contact information associated with the user device. In response to this API call, the tone creation system may automatically prompt the user to provide identifying information corresponding to the user device and/or the user that may be encoded in the audial tone. If the user provides the requisite identifying information, the tone creation system may generate and transmit the tone file to the user device as described above. In some instances, the payment processor system may provide this identifying information through the API call to the tone creation system, as described above. This may allow the tone creation system to automatically obtain the identifying information corresponding to the user device and/or the user and generate the tone file without user intervention. In these instances, the process 700 may be initiated at step 706, whereby the user device may receive the unique tone file for creation and transmission of the unique audial tone.

At step 708, the application may determine whether a connection has been established with the point-of-sale device in order to broadcast the audial tone to the point-of-sale device. As noted above, the user device and the point-of-sale device can establish a secure communications session through use of one or more communications protocols. For instance, the user device and the point-of-sale device may establish a secure communications session using a short-range wireless technology, such as Bluetooth® or Near-Field Communication (NFC) protocols. In some instances, if the point-of-sale device implements one or more wireless network protocols (e.g., Wi-Fi, etc.), the user device may access a wireless network associated with the point-of-sale device subject to these one or more wireless protocols. If the secure communications session has not been established between the user device and the point-of-sale device, the application, at step 710, may establish this secure communications session with the point-of-sale device, such as through a handshake process described above.

Once a secure communications session with the point-of-sale device has been established (or in the event of a pre-existing communications session), the application, at step 712, may broadcast the unique audial tone to the point-of-sale device in order to provide the obtained payment confirmation. As noted above, the tone file provided by the tone creation system may include executable instructions that, when executed by the application using the SDK provided by the tone creation system, may cause the application to generate an audial tone that encodes the payment confirmation and the identifying information corresponding to the user device and/or the user. Further, the audial tone may be generated to have the characteristics defined by the payment processor system such that the audial tone may be accepted and authenticated by the point-of-sale device. The application may use the SDK provided by the tone creation system and the tone file to broadcast an audial tone that encodes the payment confirmation provided by the payment processor system and other information that may be used to authenticate the audial tone (e.g., identifying information corresponding to the user device and/or user, etc.).

Figure 8:
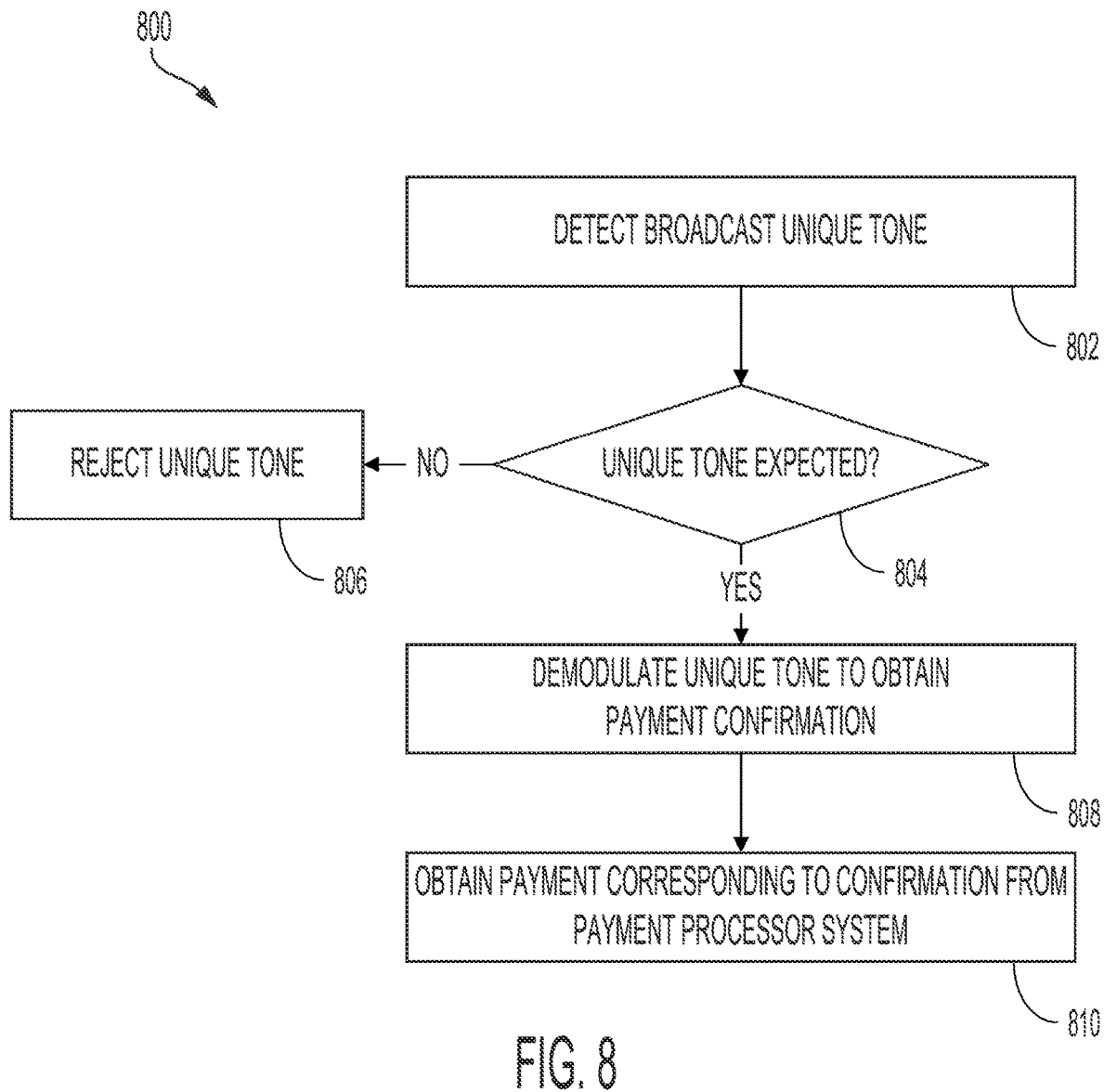
FIG. 8 shows an illustrative example of a process for demodulating a tone broadcast from a user device to obtain payment confirmation information for a payment made to another entity in accordance with at least one embodiment.

FIG. 8 shows an illustrative example of a process 800 for demodulating a tone broadcast from a user device to obtain payment confirmation information for a payment made to another entity in accordance with at least one embodiment. The process 800 may be performed by a point-of-sale device implemented at another entity's point-of-sale (e.g., store, office, kiosk, etc.). As noted above, the point-of-sale device may include a tone processing module that may implement an SDK provided by a tone creation system to detect and demodulate audial tones broadcast from other devices, such as a user's computing device. Thus, various operations of the process 800 may be performed using the tone processing module of the point-of-sale device.

At step 802, the tone processing module may detect a unique audial tone broadcast from a user device or other device within spatial proximity of the point-of-sale device. As noted above, an application executed on a user device may broadcast an audial tone that encodes a payment confirmation from a payment processor system and other data or information that may be used to authenticate the user device and/or the user that submitted the payment to the other entity. Further, the audial tone generated by the user device may be generated such that the audial tone has the characteristics defined by the payment processor system. This may allow for the audial tone to be accepted and authenticated by the point-of-sale device. The tone processing module implemented on the point-of-sale may continuously, and in real-time, monitor an area proximate to the point-of-sale device (e.g., within an audial radius of the point-of-sale device, etc.) to automatically detect any new audial tones that may be processed by the tone processing module.

In response to detecting an audial tone, the tone processing module, at step 804, may determine whether the audial tone has an expected set of characteristics. As noted above, the tone processing module may implement an algorithmic library that may be used to authenticate audial tones based on the expected characteristics of these audial tones. For instance, the algorithmic library may implement a time-based algorithm that may automatically generate expected audial signal characteristics based on the current time. This time-based algorithm may also be maintained by and synchronized between the payment processor system and the tone creation system in order to generate an audial tone that has the correct set of characteristics that may be used to authenticate the audial tone. Additionally, or alternatively, the algorithmic library may implement an algorithm that limits the number of times an audial tone having a particular set of characteristics may be processed by the point-of-sale device. For instance, if an audial tone is received with a particular set of characteristics or if an audial tone is received having the same set of characteristics as a set number of previously obtained audial tones, the tone processing module may automatically reject any subsequent audial tones having this particular set of characteristics permanently or for a particular period of time (e.g., a day, a week, etc.). These algorithms may prevent replay attacks, whereby audial tones may be mimicked to transmit repeated payment confirmations. Thus, using the aforementioned algorithmic library, the tone processing module may determine whether the received audial tone has an expected set of characteristics (e.g., frequency, pitch, amplitude, pattern, etc.).

If the tone processing module determines that the received audial tone does not have the expected set of characteristics, the tone processing module, at step 806, may automatically reject the audial tone. In some instances, if the audial tone is rejected, the tone processing module may cause the point-of-sale device to provide an indication of this rejection. For instance, the tone processing module may cause the point-of-sale device to activate an LED on the point-of-sale device (e.g., turn on, flash, etc.) that serves as an indication of the rejection of the audial tone. As another illustrative example, the tone processing module may cause the point-of-sale device to additionally, or alternatively, emit an audible sound that may be understood by the user as an indication that the audial tone was rejected (e.g., a buzzer, a losing horn, etc.). In some instances, if the point-of-sale device includes a display element, such as an LCD screen or monitor, the tone processing module may cause the pointof-sale device to display a message to the user that the audial tone was rejected. In some instances, the point-of-sale device may transmit a notification to the user device to indicate that the audial tone was rejected. As noted above, if the audial tone is rejected by the tone processing module, the application executed on the user device may transmit a notification to the payment processor system to indicate that payment confirmation could not be provided to the other entity via the point-of-sale device. Accordingly, the payment processor system may utilize one or more other methods to communicate the payment confirmation to the other entity. Alternatively, in some instances, the payment processor system may reverse the payment made to the other entity and instruct the user, via the application executed on the user device, to utilize an alternative payment method for the transaction with the other entity.

If the detected audial tone is accepted by the tone processing module, the tone processing module, at step 808, may demodulate the audial tone the audial tone and obtain the payment confirmation. For instance, the tone processing module may utilize the SDK provided by the tone creation system to demodulate the audial tone from the user device and obtain the payment confirmation encoded therein. In some instances, the tone processing module may automatically evaluate the payment confirmation and any authentication information provided therein to further determine the authenticity of the audial tone. For instance, if the authentication information includes a cryptographic hash that corresponds to a unique identifier for the financial institution that implements the payment processor system and to a unique identifier for the payment confirmation, the tone processing module may determine whether it can decrypt the cryptographic hash using a cryptographic key, shared secret, etc. established with the financial institution. In some instances, the point-of-sale device may implement a TPM or other secure cryptoprocessor that may be used to decrypt the cryptographic hash and obtain the unique identifier corresponding to the financial institution and the unique identifier for the payment confirmation. The unique identifier for the financial institution may be known to the tone processing module such that decryption of the cryptographic hash may be used to determine the authenticity of the audial tone. If the tone processing module is unable to authenticate the payment confirmation provided in the audial tone, the tone processing module may reject the payment confirmation, such as through step 806 described above.

If the payment confirmation is successfully authenticated, the tone processing module may cause the point-of-sale device to provide an indication that the payment confirmation has been received and accepted. For instance, the tone processing module may cause the point-of-sale device to activate an LED on the point-of-sale device that serves as an indication of the receipt and acceptance of the payment confirmation. As another illustrative example, the tone processing module may cause the point-of-sale device to emit an audible sound that may be understood by the user as an indication that the payment confirmation was accepted. Additionally, or alternatively, if the point-of-sale device includes a display element, such as an LCD screen or monitor, the tone processing module may cause the point-of-sale device to display a message to the user that the payment confirmation was accepted. This message may include the payment confirmation itself, which the other entity may also review to confirm that payment was received. In some instances, the point-of-sale device may transmit a notification to the user device to indicate that the payment confirmation was successfully received by the point-of-sale device.

Once the payment confirmation has been accepted and provided to the other entity, the other entity, at step 810, may obtain the payment corresponding to the payment confirmation from the payment processor system provided through the user device. For instance, the other entity may access the account indicated in the payment confirmation to obtain the payment submitted by the user through the payment processor system. Thus, the other entity may obtain payment through the user device without having to configure the point-of-sale device with network connectivity to the payment processor system or to other remote networks.

Figure 9:
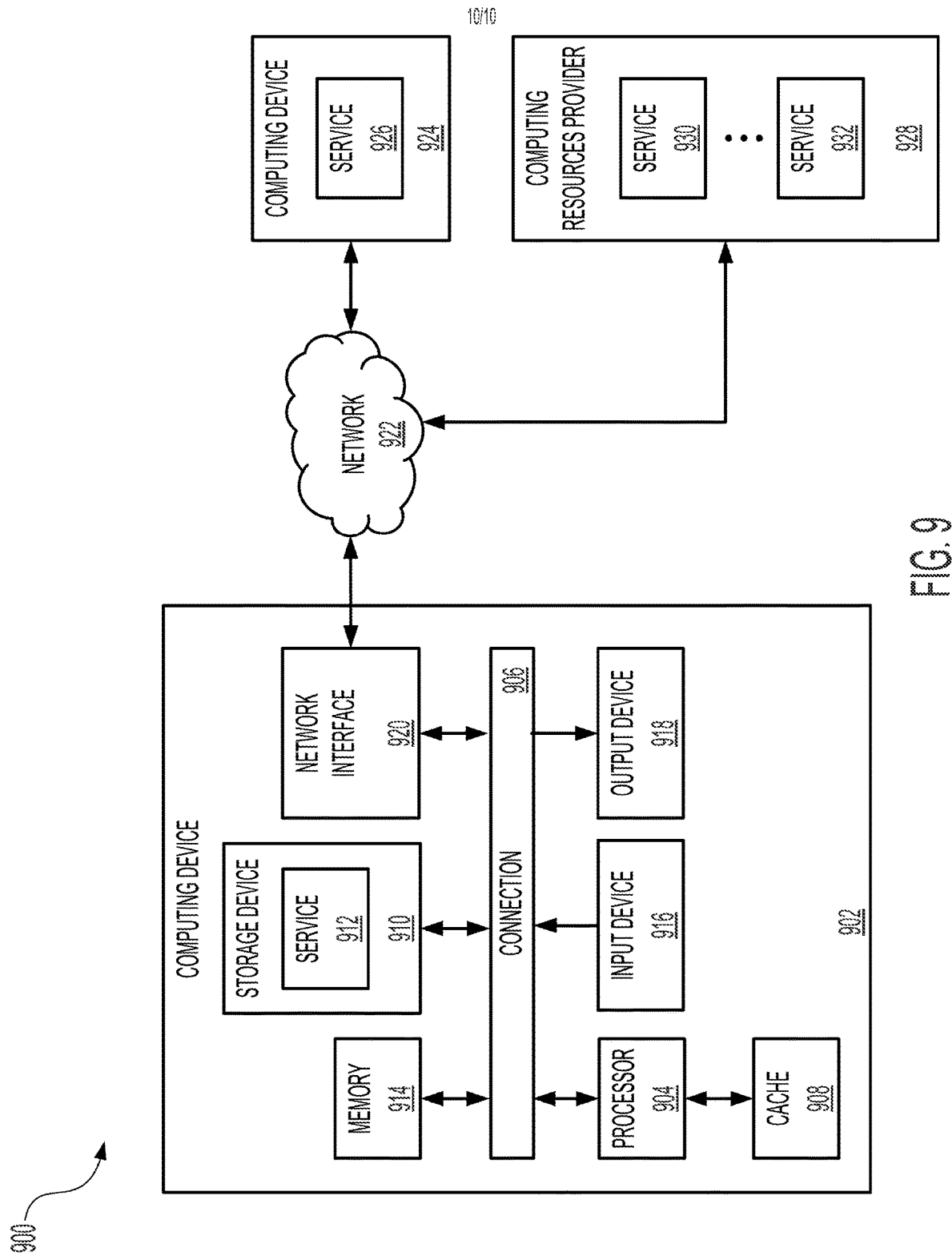
FIG. 9 shows a computing system architecture including various components in electrical communication with each other using a connection in accordance with various embodiments.

FIG. 9 illustrates a computing system architecture 900, including various components in electrical communication with each other, in accordance with some embodiments. The example computing system architecture 900 illustrated in FIG. 9 includes a computing device 902, which has various components in electrical communication with each other using a connection 906, such as a bus, in accordance with some implementations. The example computing system architecture 900 includes a processing unit 904 that is in electrical communication with various system components, using the connection 906, and including the system memory 914. In some embodiments, the system memory 914 includes read-only memory (ROM), random-access memory (RAM), and other such memory technologies including, but not limited to, those described herein. In some embodiments, the example computing system architecture 900 includes a cache 908 of high-speed memory connected directly with, in close proximity to, or integrated as part of the processor 904. The system architecture 900 can copy data from the memory 914 and/or the storage device 910 to the cache 908 for quick access by the processor 904. In this way, the cache 908 can provide a performance boost that decreases or eliminates processor delays in the processor 904 due to waiting for data. Using modules, methods and services such as those described herein, the processor 904 can be configured to perform various actions. In some embodiments, the cache 908 may include multiple types of cache including, for example, level one (L1) and level two (L2) cache. The memory 914 may be referred to herein as system memory or computer system memory. The memory 914 may include, at various times, elements of an operating system, one or more applications, data associated with the operating system or the one or more applications, or other such data associated with the computing device 902.

Other system memory 914 can be available for use as well. The memory 914 can include multiple different types of memory with different performance characteristics. The processor 904 can include any general purpose processor and one or more hardware or software services, such as service 912 stored in storage device 910, configured to control the processor 904 as well as a special-purpose processor where software instructions are incorporated into the actual processor design. The processor 904 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 904 can be a microprocessor, a microcontroller, a digital signal processor ("DSP"), or a combination of these and/or other types of processors. In some embodiments, the processor 904 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 900, an input device 916 can represent any number of input mechanisms, such as a microphone for speech, a touch-sensitive screen for gesture or graphical input, keyboard, mouse, motion input, pen, and other such input devices. An output device 918 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 900. In some embodiments, the input device 916 and/or the output device 918 can be coupled to the computing device 902 using a remote connection device such as, for example, a communication interface such as the network interface 920 described herein. In such embodiments, the communication interface can govern and manage the input and output received from the attached input device 916 and/or output device 918. As may be contemplated, there is no restriction on operating on any particular hardware arrangement and accordingly the basic features here may easily be substituted for other hardware, software, or firmware arrangements as they are developed.

In some embodiments, the storage device 910 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described above, the storage device 910 can include hardware and/or software services such as service 912 that can control or configure the processor 904 to perform one or more functions including, but not limited to, the methods, processes, functions, systems, and services described herein in various embodiments. In some embodiments, the hardware or software services can be implemented as modules. As illustrated in example computing system architecture 900, the storage device 910 can be connected to other parts of the computing device 902 using the system connection 906. In an embodiment, a hardware service or hardware module such as service 912, that performs a function can include a software component stored in a non-transitory computer-readable medium that, in connection with the necessary hardware components, such as the processor 904, connection 906, cache 908, storage device 910, memory 914, input device 916, output device 918, and so forth, can carry out the functions such as those described herein.

The disclosed processed for generating and executing experience recommendations can be performed using a computing system such as the example computing system illustrated in FIG. 9, using one or more components of the example computing system architecture 900. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and functions for generating and executing experience recommendations described herein by, for example, executing code using a processor such as processor 904 wherein the code is stored in memory such as memory 914 as described herein. One or more of a user device, a provider server or system, a database system, or other such devices, services, or systems may include some or all of the components of the computing system such as the example computing system illustrated in FIG. 9, using one or more components of the example computing system architecture 900 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 928. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 904 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 914 can be coupled to the processor 904 by, for example, a connector such as connector 906, or a bus. As used herein, a connector or bus such as connector 906 is a communications system that transfers data between components within the computing device 902 and may, in some embodiments, be used to transfer data between computing devices. The connector 906 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 914 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 914 can also include magnetic or optical data storage media including read-only (e.g., CD ROM and DVD ROM) or otherwise (e.g., CD or DVD). The memory can be local, remote, or distributed.

As described above, the connector 906 (or bus) can also couple the processor 904 to the storage device 910, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. Some of this data is may be written, by a direct memory access process, into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 910. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 906 can also couple the processor 904 to a network interface device such as the network interface 920. The interface can include one or more of a modem or other such network interfaces including, but not limited to those described herein. It will be appreciated that the network interface 920 may be considered to be part of the computing device 902 or may be separate from the computing device 902. The network interface 920 can include one or more of an analog modem, Integrated Services Digital Network (ISDN) modem, cable modem, token ring interface, satellite transmission interface, or other interfaces for coupling a computer system to other computer systems. In some embodiments, the network interface 920 can include one or more input and/or output (I/O) devices. The I/O devices can include, by way of example but not limitation, input devices such as input device 916 and/or output devices such as output device 918. For example, the network interface 920 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™, SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 902 can be connected to one or more additional computing devices such as computing device 924 via a network 922 using a connection such as the network interface 920. In such embodiments, the computing device 924 may execute one or more services 926 to perform one or more functions under the control of, or on behalf of, programs and/or services operating on computing device 902. In some embodiments, a computing device such as computing device 924 may include one or more of the types of components as described in connection with computing device 902 including, but not limited to, a processor such as processor 904, a connection such as connection 906, a cache such as cache 908, a storage device such as storage device 910, memory such as memory 914, an input device such as input device 916, and an output device such as output device 918. In such embodiments, the computing device 924 can carry out the functions such as those described herein in connection with computing device 902. In some embodiments, the computing device 902 can be connected to a plurality of computing devices such as computing device 924, each of which may also be connected to a plurality of computing devices such as computing device 924. Such an embodiment may be referred to herein as a distributed computing environment.

The network 922 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 922 can be wired connections, wireless connections, or combinations thereof. Communications via the network 922 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 922, within the computing device 902, within the computing device 924, or within the computing resources provider 928 can include information, which also may be referred to herein as content. The information may include text, graphics, audio, video, haptics, and/or any other information that can be provided to a user of the computing device such as the computing device 902. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 902 and presented to a user of the computing device 902 using forms that are perceptible via sight, sound, smell, taste, touch, or other such mechanisms. In some embodiments, communications over the network 922 can be received and/or processed by a computing device configured as a server. Such communications can be sent and received using PHP: Hypertext Preprocessor ("PHP"), Python™, Ruby, Perl® and variants, Java®, HTML, XML, or another such server-side processing language.

In some embodiments, the computing device 902 and/or the computing device 924 can be connected to a computing resources provider 928 via the network 922 using a network interface such as those described herein (e.g. network interface 920). In such embodiments, one or more systems (e.g., service 930 and service 932) hosted within the computing resources provider 928 (also referred to herein as within "a computing resources provider environment") may execute one or more services to perform one or more functions under the control of, or on behalf of, programs and/or services operating on computing device 902 and/or computing device 924. Systems such as service 930 and service 932 may include one or more computing devices such as those described herein to execute computer code to perform the one or more functions under the control of, or on behalf of, programs and/or services operating on computing device 902 and/or computing device 924.

For example, the computing resources provider 928 may provide a service, operating on service 930 to store data for the computing device 902 when, for example, the amount of data that the computing device 902 exceeds the capacity of storage device 910. In another example, the computing resources provider 928 may provide a service to first instantiate a virtual machine (VM) on service 932, use that VM to access the data stored on service 932, perform one or more operations on that data, and provide a result of those one or more operations to the computing device 902. Such operations (e.g., data storage and VM instantiation) may be referred to herein as operating "in the cloud," "within a cloud computing environment," or "within a hosted virtual machine environment," and the computing resources provider 928 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 928 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 930 and service 932 may implement versions of various services (e.g., the service 912 or the service 926) on behalf of, or under the control of, computing device 902 and/or computing device 924. Such implemented versions of various services may involve one or more virtualization techniques so that, for example, it may appear to a user of computing device 902 that the service 912 is executing on the computing device 902 when the service is executing on, for example, service 930. As may also be contemplated, the various services operating within the computing resources provider 928 environment may be distributed among various systems within the environment as well as partially distributed onto computing device 924 and/or computing device 902.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a key pad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to temporarily or permanently store data. A network interface, such as a wireless or wired interface, can enable the computing device to communicate with a network. Examples of computing devices (e.g., the computing device 902) include, but is not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram (e.g., the processes illustrated in FIGS. 6-8). Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 902.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to more clearly illustrate embodiments and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112 (f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
    receiving, at an application executing on a user device, a request to initiate a transaction with an entity associated with a point-of-sale device, wherein the point-of-sale device is implemented without network connectivity, and wherein the point-of-sale device continuously emits a presence audial tone that denotes a presence of the point-of-sale device and encodes entity information;
    automatically activating a microphone implemented on the user device in response to the request;
    detecting, at the application and through the microphone, the presence audial tone;
    transmitting a user device audial tone that encodes cryptographic information for performing a handshake process to establish a secure communications session between the user device and the point-of-sale device;
    receiving, at the application and through the secure communications session, payment transaction information associated with the entity;
    transmitting a request through the user device to transfer a payment to the entity, wherein the request includes the entity information and the payment transaction information, and wherein when the request is received by a payment processing system, the payment processing system transfers the payment to the entity;
    receiving a payment processing system confirmation at the application, wherein the payment processing system confirmation indicates that the payment has been transferred to the entity;
    transmitting a confirmation audial tone that encodes the payment processing system confirmation, wherein when the confirmation audial tone is received at the point-of-sale device, the point-of-sale device demodulates the confirmation audial tone to obtain the payment processing system confirmation.

2. The computer-implemented method of claim 1, wherein the payment processing system confirmation further indicates a set of characteristics for the confirmation audial tone, and wherein the set of characteristics correspond to an algorithmic library implemented by the point-of-sale device for authentication of the confirmation audial tone.

3. The computer-implemented method of claim 1, wherein the confirmation audial tone is generated using ultrasonic sound produced using one or more speakers implemented on the user device.

4. The computer-implemented method of claim 1, further comprising:
    triggering a notification to initiate the transaction, wherein the notification is triggered in response to detecting the presence audial tone; and
    receiving an input through the application, wherein the input corresponds to the transaction and to the entity, and wherein when the input is received, the application causes the user device to transmit the user device audial tone.

5. The computer-implemented method of claim 1, further comprising:
    evaluating the entity information;
    determining, at the application, that additional information is required to complete the transaction; and
    updating an interface associated with the application and provided through the user device to provide a prompt for the additional information.

6. The computer-implemented method of claim 1, wherein the presence audial tone, the user device audial tone, and the confirmation audial tone are transmitted using different wave frequencies at a limit of human audibility.

7. The computer-implemented method of claim 1, further comprising:
    transmitting an application programming interface (API) call to obtain a tone file that encodes the cryptographic information, wherein when the API call is obtained by a tone creation system, the tone creation system provides the tone file; and
    processing, at the application, the tone file to generate the user device audial tone.

8. A system, comprising:
    a microphone;
    one or more processors; and
    memory storing thereon instructions that, as a result of being executed by the one or more processors, cause the system to:
        receive, at an application executing on the system, a request to initiate a transaction with an entity associated with a point-of-sale device, wherein the point-of-sale device is implemented without network connectivity, and wherein the point-of-sale device continuously emits a presence audial tone that denotes a presence of the point-of-sale device and encodes entity information;
        automatically activate the microphone in response to the request;
        detect, at the application and through the microphone, the presence audial tone;
        transmit a user device audial tone that encodes cryptographic information for performing a handshake process to establish a secure communications session between the system and the point-of-sale device;
        receive, at the application and through the secure communications session, payment transaction information associated with the entity;
        transmit a request through the system to transfer a payment to the entity, wherein the request includes the entity information and the payment transaction information, and wherein when the request is received by a payment processing system, the payment processing system transfers the payment to the entity;
        receive a payment processing system confirmation at the application, wherein the payment processing system confirmation indicates that the payment has been transferred to the entity; and
        transmit a confirmation audial tone that encodes the payment processing system confirmation, wherein when the confirmation audial tone is received at the point-of-sale device, the point-of-sale device demodulates the confirmation audial tone to obtain the payment processing system confirmation.

9. The system of claim 8, wherein the payment processing system confirmation further indicates a set of characteristics for the confirmation audial tone, and wherein the set of characteristics correspond to an algorithmic library implemented by the point-of-sale device for authentication of the confirmation audial tone.

10. The system of claim 8, wherein:
the system further comprises one or more speakers; and
the confirmation audial tone is generated using ultrasonic sound produced using the one or more speakers.

11. The system of claim 8, wherein the instructions further cause the system to:
trigger a notification to initiate the transaction, wherein the notification is triggered in response to detecting the presence audial tone; and
receive an input through the application, wherein the input corresponds to the transaction and to the entity, and wherein when the input is received, the application causes the system to transmit the user device audial tone.

12. The system of claim 8, wherein the instructions further cause the system to:
evaluate the entity information;
determine, at the application, that additional information is required to complete the transaction; and
update an interface associated with the application and provided through the system to provide a prompt for the additional information.

13. The system of claim 8, wherein the presence audial tone, the user device audial tone, and the confirmation audial tone are transmitted using different wave frequencies at a limit of human audibility.

14. The system of claim 8, wherein the instructions further cause the system to:
transmit an application programming interface (API) call to obtain a tone file that encodes the cryptographic information, wherein when the API call is obtained by a tone creation system, the tone creation system provides the tone file; and
process, at the application, the tone file to generate the user device audial tone.

15. A non-transitory, computer-readable storage medium storing thereon executable instructions that, as a result of being executed by one or more processors of a computer system, cause the computer system to:
receive, at an application executing on the computer system, a request to initiate a transaction with an entity associated with a point-of-sale device, wherein the point-of-sale device is implemented without network connectivity, and wherein the point-of-sale device continuously emits a presence audial tone that denotes a presence of the point-of-sale device and encodes entity information;
automatically activate a microphone implemented on the computer system in response to the request;
detect, at the application and through the microphone, the presence audial tone;
transmit a user device audial tone that encodes cryptographic information for performing a handshake process to establish a secure communications session between the computer system and the point-of-sale device;
receive, at the application and through the secure communications session, payment transaction information associated with the entity;
transmit a request through the computer system to transfer a payment to the entity, wherein the request includes the entity information and the payment transaction information, and wherein when the request is received by a payment processing system, the payment processing system transfers the payment to the entity;
receive a payment processing system confirmation at the application, wherein the payment processing system confirmation indicates that the payment has been transferred to the entity; and
transmit a confirmation audial tone that encodes the payment processing system confirmation, wherein when the confirmation audial tone is received at the point-of-sale device, the point-of-sale device demodulates the confirmation audial tone to obtain the payment processing system confirmation.

16. The non-transitory, computer-readable storage medium of claim 15, wherein the payment processing system confirmation further indicates a set of characteristics for the confirmation audial tone, and wherein the set of characteristics correspond to an algorithmic library implemented by the point-of-sale device for authentication of the confirmation audial tone.

17. The non-transitory, computer-readable storage medium of claim 15, wherein the confirmation audial tone is generated using ultrasonic sound produced using one or more speakers implemented on the computer system.

18. The non-transitory, computer-readable storage medium of claim 15, wherein the executable instructions further cause the computer system to:
trigger a notification to initiate the transaction, wherein the notification is triggered in response to detecting the presence audial tone; and
receive an input through the application, wherein the input corresponds to the transaction and to the entity, wherein when the input is received, the application causes the computer system to transmit the user device audial tone.

19. The non-transitory, computer-readable storage medium of claim 15, wherein the executable instructions further cause the computer system to:
evaluate the entity information;
determine, at the application, that additional information is required to complete the transaction; and
update an interface associated with the application and provided through the computer system to provide a prompt for the additional information.

20. The non-transitory, computer-readable storage medium of claim 15, wherein the presence audial tone, the user device audial tone, and the confirmation audial tone are transmitted using different wave frequencies at a limit of human audibility.

21. The non-transitory, computer-readable storage medium of claim 15, wherein the executable instructions further cause the computer system to:
transmit an application programming interface (API) call to obtain a tone file that encodes the cryptographic information, wherein when the API call is obtained by a tone creation system, the tone creation system provides the tone file; and
process, at the application, the tone file to generate the user device audial tone.

* * * * *